US010821690B2

(12) United States Patent
Nakakita et al.

(10) Patent No.: US 10,821,690 B2
(45) Date of Patent: Nov. 3, 2020

(54) TIRE AND METHOD FOR MANUFACTURING TIRE

(71) Applicant: BRIDGESTONE CORPORATION, Tokyo (JP)

(72) Inventors: Yukinori Nakakita, Tokyo (JP); Kunio Machida, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 308 days.

(21) Appl. No.: 15/739,522

(22) PCT Filed: Jun. 29, 2016

(86) PCT No.: PCT/JP2016/069311
§ 371 (c)(1),
(2) Date: Dec. 22, 2017

(87) PCT Pub. No.: WO2017/002872
PCT Pub. Date: Jan. 5, 2017

(65) Prior Publication Data
US 2018/0169985 A1 Jun. 21, 2018

(30) Foreign Application Priority Data
Jun. 29, 2015 (JP) ................. 2015-130176

(51) Int. Cl.
B29D 30/06 (2006.01)
B29D 30/40 (2006.01)
(Continued)

(52) U.S. Cl.
CPC ......... B29D 30/0633 (2013.01); B29D 30/06 (2013.01); B29D 30/1628 (2013.01);
(Continued)

(58) Field of Classification Search
CPC ................ B29D 30/0633; B29D 30/06; B29D 30/1628; B29D 30/38
See application file for complete search history.

(56) References Cited

U.S. PATENT DOCUMENTS 4,754,794 A * 7/1988 Bocquet ................. B29C 70/16
152/527
5,127,456 A 7/1992 Davriu et al.
(Continued)

FOREIGN PATENT DOCUMENTS

CN 102548774 A 7/2012
EP 0189749 A1 8/1986
(Continued)

OTHER PUBLICATIONS

Communication dated Dec. 28, 2018, from State Intellectual Property Office of the P.R.C. in counterpart application No. 201680038014X.
(Continued)

Primary Examiner — Jacob T Minskey
Assistant Examiner — Virak Nguon
(74) Attorney, Agent, or Firm — Sughrue Mion, PLLC

(57) ABSTRACT

Provided are: a tire including: a tire frame; and a reinforcing metal cord member that is wound at least on the outer circumference of the tire frame, wherein at least a portion of the reinforcing metal cord member is coated with a coating composition via an adhesion layer that contains a polyamide-based adhesive and has a melting point of from 160° C. to 200° C., the coating composition containing at least one thermoplastic material selected from polyamide-based thermoplastic resins having a melting point of from 160° C. to 240° C. and polyamide-based thermoplastic elastomers having a melting point of from 160° C. to 240° C.; and a method of producing the same.

23 Claims, 5 Drawing Sheets

(51) Int. Cl.
  *D07B 1/06* (2006.01)
  *B29D 30/38* (2006.01)
  *B60C 5/00* (2006.01)
  *B60C 11/00* (2006.01)
  *B60C 5/01* (2006.01)
  *B29D 30/16* (2006.01)
  *B60C 1/00* (2006.01)
  *B60C 9/00* (2006.01)
  *B60C 9/22* (2006.01)
  *B29B 15/12* (2006.01)
  *B29D 30/00* (2006.01)

(52) U.S. Cl.
  CPC .......... *B29D 30/38* (2013.01); *B29D 30/40* (2013.01); *B60C 1/0016* (2013.01); *B60C 5/007* (2013.01); *B60C 5/01* (2013.01); *B60C 9/0007* (2013.01); *B60C 9/2204* (2013.01); *B60C 11/00* (2013.01); *D07B 1/0666* (2013.01); *B29B 15/122* (2013.01); *B29D 2030/0077* (2013.01); *B29D 2030/0639* (2013.01); *B29D 2030/383* (2013.01); *B60C 2009/0014* (2013.01); *B60C 2009/0021* (2013.01); *D07B 2205/2046* (2013.01)

(56) References Cited

U.S. PATENT DOCUMENTS

| | | | |
|---|---|---|---|
| 2012/0152428 A1* | 6/2012 | Kouno | B60C 15/06 152/526 |
| 2013/0177764 A1 | 7/2013 | Abad et al. | |
| 2013/0206301 A1* | 8/2013 | Fudemoto | B60C 9/22 152/450 |
| 2013/0280511 A1 | 10/2013 | Abad et al. | |
| 2015/0030851 A1 | 1/2015 | Abad et al. | |
| 2015/0053323 A1 | 2/2015 | Harada et al. | |
| 2016/0075182 A1 | 3/2016 | Machida | |
| 2016/0152079 A1 | 6/2016 | Machida et al. | |
| 2016/0167439 A1* | 6/2016 | Ahouanto | B60C 9/02 152/451 |
| 2016/0193878 A1* | 7/2016 | Tamada | B32B 15/015 152/527 |
| 2017/0259515 A1 | 9/2017 | Kon et al. | |

FOREIGN PATENT DOCUMENTS

| | | |
|---|---|---|
| FR | 2963579 A1 | 2/2012 |
| JP | 61-169227 A | 7/1986 |
| JP | 63-25110 A | 2/1988 |
| JP | 2010053495 A | 3/2010 |
| JP | 2011-042235 A | 3/2011 |
| JP | 2013-180619 A | 9/2013 |
| JP | 2015-513006 A | 4/2015 |
| WO | 2012038341 A1 | 3/2012 |
| WO | 2013/129627 A1 | 9/2013 |
| WO | 2014/175453 A1 | 10/2014 |
| WO | 2014175452 A1 | 10/2014 |
| WO | 2016/084535 A1 | 6/2016 |

OTHER PUBLICATIONS

Communication dated May 25, 2018, from the European Patent Office in counterpart European Application No. 16817980.2.
International Search Report for PCT/JP2016/069311 dated Aug. 23, 2016 [PCT/ISA/210].

* cited by examiner

TIRE AND METHOD FOR MANUFACTURING TIRE

CROSS REFERENCE TO RELATED APPLICATIONS

This application is a National Stage of International Application No. PCT/JP2016/069311 filed Jun. 29, 2016, claiming priority based on Japanese Patent Application No. 2015-130176 filed Jun. 29, 2016, the contents of which are incorporated herein by reference in their entirety.

TECHNICAL FIELD

The present invention relates to: a tire to be fitted onto a rim; and a method of producing the tire.

BACKGROUND ART

Conventionally, pneumatic tires composed of a rubber, an organic fiber material, a steel member and the like have been used in vehicles such as passenger cars. In recent years, the use of resin materials, particularly thermoplastic polymer materials such as thermoplastic resins and thermoplastic elastomers as tire materials, has been examined from the viewpoints of weight reduction, ease of molding and recyclability. Tires using a thermoplastic polymer material can be produced more easily and at a lower cost than rubber-made tires.

While weight reduction is demanded in tires, tires are also required to have high durability. As an attempt to improve the tire durability, a method of arranging a reinforcing layer on the tire radial-direction outer surface of the tread bottom portion of a tire main body (tire frame), which reinforcing layer is formed by continuously and helically winding a reinforcing cord in the tire circumferential direction, has been proposed. For example, there has been proposed a tire in which at least a portion of a reinforcing metal cord member wound on the outer circumference of a tire frame is coated with a coating composition that contains at least one thermoplastic material selected from thermoplastic resins and thermoplastic elastomers, via an adhesion layer containing a hot-melt adhesive (see, for example, WO2014/175453).

SUMMARY OF THE INVENTION

Technical Problem

Generally, in cases where a reinforcing cord is used, from the viewpoint of tire performance, it is required that the reinforcing cord is sufficiently fixed on a tire frame. In the tire disclosed in Patent Document 1, it is described that the adhesion durability between the tire frame and a reinforcing member such as a steel cord can be improved by coating a reinforcing metal cord with a coating composition via an adhesion layer containing a hot-melt adhesive.

However, in the adhesion layer of the tire disclosed in Patent Document 1, there is a room for further improvement of adhesion against a heat treatment (e.g., vulcanization at 140° C. or higher) performed after the coating with the coating composition.

The invention was made in view of the above-described circumstances, and an object of the invention is to provide: a tire having excellent durability against a heat treatment performed after coating with a coating composition; and a method of producing the tire.

Solution to Problem

A concrete means for achieving the above-described object includes the following modes.

[1] A tire, comprising: a tire frame; and a reinforcing metal cord member that is wound on at least an outer circumference of the tire frame, wherein at least a portion of the reinforcing metal cord member is coated with a coating composition comprising at least one thermoplastic material selected from a polyamide-based thermoplastic resin having a melting point of from 160° C. to 240° C. or a polyamide-based thermoplastic elastomer having a melting point of from 160° C. to 240° C., and wherein the at least a portion of the reinforcing metal cord member is coated with the coating composition via an adhesion layer having a melting point of from 160° C. to 200° C. and comprising a polyamide-based adhesive.

[2] The tire according to [1], wherein the melting point of the adhesion layer is from 160° C. to 180° C.

[3] The tire according to [1] or [2], wherein a thickness of the adhesion layer is in a range of from 5 μm to 200 μm.

[4] The tire according to any one of [1] to [3], wherein a thickness of the coating composition is in a range of from 10 μm to 1,000 μm.

[5] The tire according to any one of [1] to [4], wherein a thickness ratio of the adhesion layer to the coating composition (adhesion layer/coating composition) is from 1/20 to 10/1.

[6] The tire according to any one of [1] to [5], wherein the tire frame comprises a resin material comprising a resin component in an amount of from 50% by mass to 100% by mass.

[7] A method of producing a tire, the method comprising: forming a tire frame; coating at least a portion of a reinforcing metal cord member with a coating composition comprising at least one thermoplastic material selected from a polyamide-based thermoplastic resin having a melting point of from 160° C. to 240° C. or a polyamide-based thermoplastic elastomer having a melting point of from 160° C. to 240° C., wherein the at least a portion of the reinforcing metal cord member is coated with the coating composition via an adhesion layer having a melting point of from 160° C. to 200° C. and comprising a polyamide-based adhesive; and winding the reinforcing metal cord member onto the tire frame, wherein the coating of the at least a portion of the reinforcing metal cord member with the coating composition is performed by extruding the coating composition from an extruder having a mold temperature that is not lower than the melting point of the adhesion layer and that is from 160° C. to 200° C.

Effects of Invention

According to the invention, a tire having excellent durability against a heat treatment performed after coating with a coating composition, and a method of producing the tire can be provided.

DESCRIPTION OF EMBODIMENTS

Mode for Carrying Out the Invention

Figure 1A:
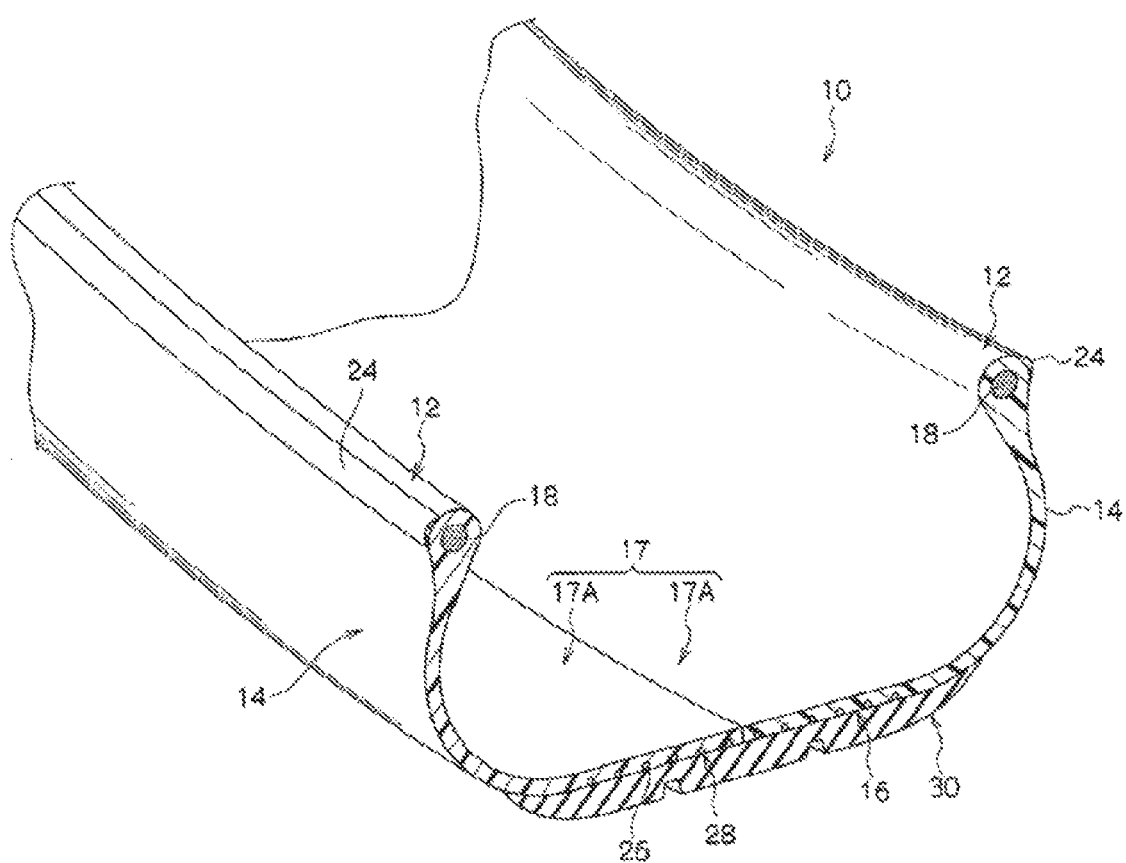
FIG. 1A is a perspective view illustrating a cross-section of a part of a tire according to one embodiment of the invention.

Specific embodiments of the invention will be described in detail hereinafter. However, it should be noted that the invention is not restricted to the embodiments below but can be carried out with appropriate modification within the scope of the object of the invention.

In the present specification, the concept of "resin" includes thermoplastic resins and thermoset resins, but does not include conventional vulcanized rubbers, such as natural rubbers and synthetic rubbers.

In the below description of resins, components of "the same type" means those main chains of which being formed of a common skeleton, examples of which including ester-based ones or styrene-based ones.

In the case that the term "multiple resin layer" is described in below, the term indicates a layer in a state of layered, in which an adhesive layer is coated with a coating composition.

In the present specification, a numerical range expressed using "from A to B" means a range including A and B as a lower limit value and an upper limit value respectively.

In addition, the term "step" means not only an individual step but also a step in which an expected object in the step is attained even when the step cannot be clearly distinguished from one or more other steps.

Further, the term "melting point" used herein refers to a temperature at which an endothermic peak is observed in a curve (DSC curve) obtained by differential scanning calorimetry (DSC).

The melting point is measured in accordance with ASTMD3418-8 using a differential scanning calorimeter (DSC). Specifically, a measurement subject is placed on an aluminum pan and an empty pan is set as a control, after which the measurement is performed at a heating rate of 10° C./min. The melting point of indium and that of zinc are used for temperature correction of the detection unit of the measuring device, and the fusion heat of indium is used for colorimetric correction.

The tire of the invention includes: a tire frame; and a reinforcing metal cord member that is wound at least on the outer circumference of the tire frame, wherein at least a portion of the reinforcing metal cord member is coated with a coating composition via an adhesion layer that contains a polyamide-based adhesive and has a melting point of from 160° C. to 200° C., the coating composition containing at least one thermoplastic material selected from polyamide-based thermoplastic resins having a melting point of from 160° C. to 240° C. and polyamide-based thermoplastic elastomers having a melting point of from 160° C. to 240° C.

In the tire of the invention, by adopting the above-described configuration, a reduction in the material strength, such as the elastic modulus and yield strength of the adhesion layer, that is caused by a heat treatment performed after the coating with the coating composition can be suppressed, so that a reduction in the adhesiveness of the adhesion layer is inhibited. Accordingly, excellent adhesion is attained between the reinforcing metal cord member and the adhesion layer as well as between the adhesion layer and the coating composition. Consequently, a tire having excellent durability, whose multiple resin layer shows high durability even after a heat treatment, can be realized.

In a case in which the tire is manufactured using the reinforcing metal cord member, the metal reinforcing member is desirably sufficiently fixed to the tire frame in view of the durability of the tire. In view of ride quality of an automobile or the like, the material used for the tire frame is preferably flexible. However, in a case in which a rigid member, such as a steel cord, is employed as the reinforcing metal cord member, there is a large difference in elastic modulus (a rigidity difference) between the flexible of flexible material of the tire frame and the reinforcing metal cord member, and it becomes difficult to maintain sufficient adhesion durability between the tire frame and the reinforcing metal cord member.

In the invention, at least a portion of the reinforcing metal cord member is coated with a coating composition via an adhesion layer that contains a polyamide-based adhesive and has a melting point of from 160° C. to 200° C., the coating composition containing at least one thermoplastic material selected from polyamide-based thermoplastic resins having a melting point of from 160° C. to 240° C. and polyamide-based thermoplastic elastomers having a melting point of from 160° C. to 240° C.; therefore, the reinforcing metal cord member and the coating composition are firmly fixed with each other, and the pull-out resistance of the reinforcing metal cord member from the coating composition is improved. Further, in the invention, since the coating composition exists at the interface between the reinforcing metal cord member and the material constituting the tire frame, the difference in rigidity between the reinforcing metal cord member and the tire frame is reduced. As a result, in the tire of the invention, the adhesion durability between the reinforcing metal cord member and the tire frame is improved, in addition, by winding the reinforcing metal cord member, which has excellent adhesion durability with the tire frame, on the outer circumference of the tire frame, the durability of the tire (e.g., puncture resistance, cut resistance, tire circumferential rigidity) is improved. An improvement in the circumferential rigidity leads to inhibition of creeping of the tire frame formed from a resin material (a phenomenon that plastic deformation of the tire frame increases with time under constant stress).

In one embodiment of the invention, by forming the tire frame using a resin material, a vulcanization step that is a step indispensable for conventional rubber-made tires can be omitted and, for example, the tire frame can be formed by injection molding or the like. This enables to improve the productivity through simplification of the production process, reduction in time and cost, and the like. Further, the use of a resin material for the tire frame allows simplification of the tire structure as compared to conventional rubber-made tires, and this consequently enables to realize weight reduction of the tire. As a result, by forming such a tire frame, the wear resistance and durability of the tire can be improved.

Hereinafter, the reinforcing metal cord member, the coating composition coating the same, the polyamide-based adhesive contained in the adhesion layer that is arranged between the reinforcing metal cord member and the coating composition and has a melting point of from 160° C. to 200° C., and the material constituting the tire frame, which are used in several embodiments of the invention, will be described in the order mentioned, and concrete embodiments of the tire of the invention will then be described referring to the drawings.

[Reinforcing Metal Cord Member]

As the reinforcing metal cord member in one embodiment of the invention, a metal cord or the like used in a conventional rubber-made tire can be used as appropriate, and examples thereof include a monofilament (single strand) of metal fibers, and a multifilament (twisted strand) such as a steel cord obtained by twisting steel fibers. As the reinforcing metal cord member, a multifilament is preferable from the viewpoint of further improving the tire durability. The cross-sectional shape, size (diameter) and the like of the reinforcing metal cord member are not particularly limited, and any reinforcing metal cord member that is suitable for the desired tire may be selected and used as appropriate.

In the tire according to one embodiment of the invention, a single reinforcing metal cord member or plural reinforcing metal cord members may be wound in the circumferential direction of the tire frame, and the winding may be performed in a continuous and helical manner in the circumferential direction. Further, the reinforcing metal cord member(s) may be wound in the circumferential direction in an evenly spaced manner along the width direction of the tire frame, or may be wound in an intersecting manner.

The tensile elastic modulus of the reinforcing metal cord member itself is typically from approximately 100000 MPa to approximately 300000 MPa, preferably from 120000 MPa to 270000 MPa, and more preferably from 150000 MPa to 250000 MPa. Note that the tensile elastic modulus of the reinforcing metal cord member is calculated from the gradient of a stress-strain curve plotted using a ZWICK-type chuck in a tensile test machine.

The elongation at break (namely, tensile elongation at break) of the reinforcing metal cord member itself is typically from approximately 0.1% to approximately 15%, preferably from 1% to 15%, and more preferably from 1% to 10%. The tensile elongation at break of the reinforcing metal cord member may be determined from the strain obtained by a stress-strain curve plotted using ZWICK-type chuck in a tensile test machine.

In one embodiment of the invention, the reinforcing metal cord member is wound onto the outer circumference of the tire frame, and at least a portion of the reinforcing metal cord member is coated with a coating composition via the below-described adhesion layer that contains a polyamide-based adhesive and has a melting point of from 160° C. to 200° C., the coating composition containing at least one thermoplastic material selected from the below-described polyamide-based thermoplastic resins having a melting point of from 160° C. to 240° C. and polyamide-based thermoplastic elastomers having a melting point of from 160° C. to 240° C.

The phrase "at least a portion of the reinforcing metal cord member is coated with a coating composition via an adhesion layer that contains a polyamide-based adhesive and has a melting point of from 160° C. to 200° C., the coating composition containing at least one thermoplastic material selected from polyamide-based thermoplastic resins having a melting point of from 160° C. to 240° C. and polyamide-based thermoplastic elastomers having a melting point of from 160° C. to 240° C." as used herein means a state in which a part or the entirety of the surface of the reinforcing metal cord member is coated with the coating composition via an adhesion layer having a melting point of from 160° C. to 200° C.

Examples of a state in which a part or the entirety of the surface of the reinforcing metal cord member is coated with the coating composition via an adhesion layer having a melting point of from 160° C. to 200° C. include: a state in which a part or the entirety of the outer circumference of the reinforcing metal cord member used as a core is coated with the coating composition via the adhesion layer having a melting point of from 160° C. to 200° C.; and a state in which, when a reinforcing metal cord coating layer containing the coating composition is formed on the outer circumference of the tire frame, with the adhesion layer having a melting point of from 160° C. to 200° C. being arranged between the layer and the frame, a part or the entirety of the reinforcing metal cord member is embedded in the reinforcing metal cord coating layer.

In one embodiment of the invention, it is preferable that the part of the reinforcing metal cord member that constitutes an interface between the reinforcing metal cord member and the tire frame is entirely coated with the coating composition via an adhesion layer having a melting point of from 160° C. to 200° C., and it is more preferable that the entire surface of the reinforcing metal cord member is coated with the coating composition via an adhesion layer having a melting point of from 160° C. to 200° C.

[Coating Composition]

The coating composition in the invention that is used for coating the reinforcing metal cord member via an adhesion layer having a melting point of from 160° C. to 200° C. contains at least one thermoplastic material selected from polyamide-based thermoplastic resins having a melting point of from 160° C. to 240° C. and polyamide-based thermoplastic elastomers having a melting point of from 160° C. to 240° C.

In addition to a polyamide-based thermoplastic resin having a melting point of from 160° C. to 240° C. or a polyamide-based thermoplastic elastomer having a melting point of from 160° C. to 240° C., the thermoplastic material may also contain a polyester-based thermoplastic resin, an olefin-based thermoplastic resin, a polyester-based thermoplastic elastomer, an olefin-based thermoplastic elastomer and/or the like within a range that exerts the effects of the invention.

The term "thermoplastic resin" used herein means a polymer compound which is softened and fluidized as the temperature is increased and becomes relatively hard and strong when cooled but does not have rubber-like elasticity.

Further, the term "thermoplastic elastomer" as used herein means a polymer compound composed of a copolymer obtained by copolymerization of a crystalline polymer constituting a high-melting-point hard segment or a high-cohesive-strength hard segment and an amorphous polymer constituting a low-glass-transition-temperature soft segment, the polymer compound being not only softened and fluidized as the temperature is increased, but also becoming relatively hard and strong when cooled, and exhibiting rubber-like elasticity.

(Polyamide-Based Thermoplastic Resin)

A polyamide-based thermoplastic resin contained in the coating composition can be selected as appropriate from those having a melting point of from 160° C. to 240° C.

By using a polyamide-based thermoplastic resin having a melting point of from 160° C. to 240° C. as the thermoplastic material contained in the coating composition to coat the below-described adhesion layer that contains a polyamide-based adhesive and has a melting point of from 160° C. to 200° C., an adhesion layer in which reduction in adhesiveness caused by a heat treatment performed after the coating is suppressed can be obtained. In addition, by using a polyamide-based thermoplastic resin having a melting point of from 160° C. to 240° C., the below-described adhesion layer that contains a polyamide-based adhesive and has a melting point of from 160° C. to 200° C. is partially melted at the time of coating the adhesion layer with the coating composition, and the adhesiveness for heat fusion of the coating composition and the adhesion layer at their interface is thereby increased. Therefore, the reinforcing metal cord member and the coating composition are firmly fixed with each other, so that the adhesion of the reinforcing metal cord member with the coating composition can be further improved.

From the viewpoint of the adhesiveness of the reinforcing metal cord member, the melting point of the polyamide-based thermoplastic resin is preferably from 160° C. to 200° C. more preferably from 160° C. to 180° C. The use of a polyamide-based thermoplastic resin having a inciting point of 160° C. or higher enables to perform high-temperature vulcanization in a short time, so that the productivity is increased. Meanwhile, the use of a polyamide-based thermoplastic resin having a melting point of 240° C. or lower allows heat fusion to take place between the coating composition and the adhesion layer at their interface at the time of heating, so that the adhesion therebetween is enhanced.

The thermoplastic material contained in the coating composition is preferably selected also taking into consideration its adhesiveness to a material used in the tire frame. Particularly, in cases where the tire frame is formed using a resin material, the adhesion between the tire frame and the coating composition can be further enhanced by using resins of the same kind as the resin material and the thermoplastic material contained in the coating composition. For example, when a polyamide-based thermoplastic resin is used as the thermoplastic material contained in the coating composition, it is preferable to use a polyamide-based thermoplastic elastomer as the resin material for forming the tire frame.

Examples of the polyamide-based thermoplastic resin include a polyamide having a melting point of from 160° C. to 240° C. among the polyamides constituting a hard segment of a polyamide-based thermoplastic elastomer to be used in the tire frame described below. Specific examples of a polyamide-based thermoplastic resin include a polyamide formed by ring-opening polycondensation of ε-caprolactam (amide 6), a polyamide formed by ring-opening polycondensation of undecane lactam (amide 11), a polyamide formed by ring-opening polycondensation of lauryl lactam (amide 12), a polyamide formed by polycondensation of a diamine and a dibasic acid (amide 66), and a polyamide having meta-xylylenediamine as a structural unit (amide MX).

An amide 6 can be represented, for example, by [CO—(CH$_2$)$_5$—NH]$_n$. An amide 11 can be represented, for example, by [CO—(CH$_2$)$_{10}$—NH]$_n$. An amide 12 can be represented, for example, by [CO—(CH$_2$)$_{11}$—NH]$_n$. An amide 66 can be represented, for example, by [CO(CH$_2$)$_4$CONH(CH$_2$)$_6$NH]$_n$. An amide MX can be represented, for example, by the following structural formula (A-1). In this regard, n represents the number of repeating units.

As a commercial product of an amide 6, for example, "UBE nylon" series (for example, 1022B, and 1011FB) produced by UBE Industries, Ltd., may be used. As a commercial product of an amide 11, for example, "RILSAN B" series produced by Arkema, may be used. As a commercial product of an amide 12, for example, "UBE nylon" series (for example, 3024U, 3020U, and 3014U) produced by UBE Industries, Ltd., may be used. As a commercial product of an amide 66, for example, "UBE nylon" series (for example, 2020B, and 2015B) produced by UBE Industries, Ltd., may be used. As a commercial product of an amide MX, for example, "MX nylon" series (for example, S6001, S6021, and S6011) produced by Mitsubishi Gas Chemical Co., Inc., may be used.

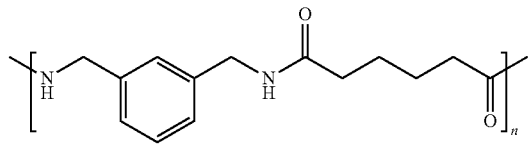

(A-1)

A polyamide-based thermoplastic resin may be a homopolymer constituted solely with the above structural unit, or may be a copolymer of the structural unit and another monomer. In the case of a copolymer, the content of the structural unit in each of polyamide-based thermoplastic resins is preferably 40 mass-% or more.

The thermoplastic material contained in the coating composition may further contain a polyester-based thermoplastic resin, an olefin-based thermoplastic resin, and/or the like.

(Polyester-Based Thermoplastic Resin)

Examples of the polyester-based thermoplastic resin include a polyester constituting a hard segment of a polyester-based thermoplastic elastomer to be used for the tire frame described below.

Specific examples of the polyester-based thermoplastic resin include an aliphatic polyester such as poly(lactic acid), polyhydroxy-3-butyl butyrate, polyhydroxy-3-hexyl butyrate, poly(ε-caprolactone), polyenantholactone, polycaprylolactone, poly(butylene adipate), or poly(ethylene adipate), and an aromatic polyester such as poly(ethylene terephthalate), poly(butylene terephthalate), poly(styrene terephthalate), poly(ethylene naphthalate), or poly(butylene naphthalate). Among them, from viewpoints of heat resistance and processability, polybutylene terephthalate) is preferable as the polyester-based thermoplastic resin.

As a commercial product of the polyester-based thermoplastic resin, for example, "DURANEX" series (for example, 2000, and 2002) produced by Polyplastics Co., Ltd., "NOVADURAN" series (for example, 5010R5, and 5010R3-2) produced by Mitsubishi Engineering-Plastics Corporation, and "TORAYCON" series (for example, 1401X06, and 1401X31) produced by Toray Industries, Inc., may be used.

—Olefin-Based Thermoplastic Resin—

Examples of the olefin-based thermoplastic resin include a polyolefin constituting a hard segment of an olefin-based thermoplastic elastomer to be used for the tire frame described below.

Specific examples of the olefin-based thermoplastic resin include a polyethylene-base thermoplastic resin, a polypropylene-base thermoplastic resin, and a polybutadiene-base thermoplastic resin. Among them, from viewpoints of heat resistance and processability, a polypropylene-base thermoplastic resin is preferable as an olefin-based thermoplastic resin.

Specific examples of the polypropylene-base thermoplastic resin include a propylene homopolymer, a propylene/α-olefin random copolymer, and a propylene/α-olefin block copolymer. Examples of the α-olefin include an α-olefin having carbon atoms of from approximately 3 to 20, such as propylene, 1-butene, 1-pentene, 3-methyl-1-butene, 1-hexene, 4-methyl-1-pentene, 3-methyl-1-pentene, 1-heptene, 1-octene, 1-decene, 1-dodecene, 1-tetradecene, 1-hexadecene, 1-octadecene, or 1-eicosene.

(Polyamide-Based Thermoplastic Elastomer)

A polyamide-based thermoplastic elastomer contained in the coating composition can be selected as appropriate from those having a melting point of from 160° C. to 240° C.

By using a polyamide-based thermoplastic elastomer having a melting point of from 160° C. to 240° C. as the thermoplastic material contained in the coating composition to coat the below-described adhesion layer that contains a polyamide-based adhesive and has a melting point of from 160° C. to 200° C., an adhesion layer in which reduction in adhesiveness caused by a heat treatment performed after the coating is suppressed can be obtained. In addition, by using a polyamide-based thermoplastic elastomer having a melting point of from 160° C. to 240° C., the below-described adhesion layer that contains a polyamide-based adhesive and has a melting point of from 160° C. to 200° C. is partially melted at the time of coating the adhesion layer with the coating composition, and the adhesiveness for heat fusion of the coating composition and the adhesion layer at their interface is thereby increased. Therefore, the reinforcing metal cord member and the coating composition are firmly fixed with each other, so that the adhesion of the reinforcing metal cord member with the coating composition can be further improved.

From the viewpoint of the adhesiveness of the reinforcing metal cord member, the melting point of the polyamide-based thermoplastic elastomer is more preferably from 160° C. to 200° C.

The use of a polyamide-based thermoplastic elastomer having a melting point of 160° C. or higher enables to perform high-temperature vulcanization in a short time, so that the productivity is increased. Meanwhile, the use of a polyimide-based thermoplastic elastomer having a melting point of 240° C. or lower allows heat fusion to take place between the coating composition and the adhesion layer at their interface at the time of heating, so that the adhesion therebetween is enhanced.

The thermoplastic material contained in the coating composition is preferably selected also taking into consideration its adhesiveness with a material used in the tire frame. Particularly, in cases where the tire frame is formed using a resin material, the adhesion between the tire frame and the coating composition can be further enhanced by using resins of the same kind as the resin material and the thermoplastic material contained in the coating composition. For example, when a polyamide-based thermoplastic elastomer is used as the thermoplastic material contained in the coating composition, it is preferable to use a polyimide-based thermoplastic elastomer as the resin material for forming the tire frame.

Examples of the polyimide-based thermoplastic elastomer include, among those polyamide-based thermoplastic elastomers that can be used in the tire frame as described below, ones having a melting point of from 160° C. to 240° C. The details of such polyimide-based thermoplastic elastomers are described below.

As a commercial product of the polyamide-based thermoplastic elastomer, for example, "UBESTA XPA" Series manufactured by UBE Industries, Ltd. (e.g., XPA9063X1 and XPA9055X1), and "VESTAMID" Series manufactured by Daicel-Evonik Ltd. (e.g., E47-S1, E47-S3, E55-S1, E55-S3, EX9200 and E50-R2) can be used.

The thermoplastic material contained in the coating composition may further contain a polyester-based thermoplastic elastomer, an olefin-based thermoplastic elastomer, and/or the like.

(Polyester-Based Thermoplastic Elastomer)

The polyester-based thermoplastic elastomer is similar to a polyester-based thermoplastic elastomer to be used in the tire frame described below, and a preferable embodiment is also similar. Therefore, detailed descriptions are omitted here.

(Olefin-Based Thermoplastic Elastomer)

The olefin-based thermoplastic elastomer is similar to an olefin-based thermoplastic elastomer to be used in the tire frame described below, and a preferable embodiment is also similar. Therefore, detailed descriptions are omitted here.

(Mode of Polyamide-Based Thermoplastic Resin and Polyamide-Based Thermoplastic Elastomer in Coating Composition)

In one embodiment of the invention, the coating composition may take a mode which contains both a polyimide-based thermoplastic resin and a polyamide-based thermoplastic elastomer and has a sea phase, which is a matrix phase containing the polyamide-based thermoplastic resin, and an island phase, which is a dispersed phase containing the polyimide-based thermoplastic elastomer. By allowing the coating composition to have a sea-island structure in which the polyamide-based thermoplastic elastomer is dispersed in a matrix composed of the polyamide-based thermoplastic resin, the adhesiveness of the reinforcing metal cord member with the coating composition can be improved.

The mass ratio (p/e) of a polyamide-based thermoplastic resin (p) to a polyamide-based thermoplastic elastomer (e) in the coating composition of the embodiment is preferably from 95/5 to 55/45 from a viewpoint of easy formation of the sea-island structure constituted with a sea phase containing the polyamide-based thermoplastic resin and an island phase containing the polyamide-based thermoplastic elastomer, more preferably from 90/10 to 60/40, and especially preferably from 85/15 to 70/30.

It is possible to confirm whether an island phase containing the polyamide-based thermoplastic elastomer is finely dispersed in a sea phase containing the polyimide-based thermoplastic resin by an observation of a photograph using a SEM (scanning electron microscope).

The size of an island phase containing the polyimide-based thermoplastic elastomer (namely, the major diameter of an island phase) is from approximately 0.4 μm to 10.0 μm, more preferably from approximately 0.5 μm to 7 μm, and especially preferably from approximately 0.5 μm to 5 μm. The size of each phase can be measured by an observation of a photograph using a SEM (scanning electron microscope).

The method of coating the adhesion layer with the coating composition is not particularly limited. From the viewpoint of the adhesion between the coating composition and the adhesion layer, a method of coating the adhesion layer by melt extrusion is preferred.

In cases where the coating composition is applied by melt extrusion, from the viewpoint of the adhesion between the coating composition and the adhesion layer, the mold temperature of an extruder is set to be preferably from 160° C. to 240° C., more preferably from 160° C. to 200° C.

That is, in the tire of the invention, the coating composition is preferably extruded from an extruder having a mold temperature of from 160° C. to 200° C.

In the invention, the thickness (average layer thickness) of the coating composition is not particularly limited; however, from the viewpoint of post-heating durability, the thickness of the coating composition is preferably from 10 μm to 1,000 μm, and more preferably from 50 μm to 700 μm.

The average layer thickness of the coating composition can be determined by the following two methods.

The first method is, for example, a method in which an operation of measuring the layer thickness of the coating composition, at a cross-section produced by cutting a reinforcing metal cord coated with the coating composition in a direction perpendicular to the cord lengthwise direction, is performed at 10 points per 1 m of the reinforcing metal cord, and the average layer thickness is determined by taking the arithmetic mean of the thus measured values of the layer thickness of the coating composition at the 10 points.

The second method is, for example, a method in which an operation of determining the layer thickness of the coating composition, by subtracting the radius of a reinforcing metal cord provided with an adhesion layer prior to the application of the coating composition, from the radius of the reinforcing metal cord on which the adhesion layer is coated with the coating composition, is performed at 10 points per 1 m of the reinforcing metal cord, and the average layer thickness is determined by taking the arithmetic mean of the thus measured values of the layer thickness of the coating composition at the 10 points.

[Adhesion Layer]

In the invention, at least a portion of the reinforcing metal cord member is coated with the above-described coating composition via an adhesion layer having a melting point of from 160° C. to 200° C. The adhesion layer having a melting point of from 160° C. to 200° C. contains a polyamide-based adhesive.

The term "polyamide-based adhesive" used herein means an adhesive having a solid content of 100% by mass, which contains a polyamide-based thermoplastic resin as a main component with no organic solvent and is either solid or semi-solid at normal temperature temperature) but is melted by heating (so-called hot-melt adhesive).

Further, the term "via an adhesion layer" means a state in which the adhesion layer exists in a part or the entirety of the space between the reinforcing metal cord member and the coating composition.

By allowing the adhesion layer to have a melting point of from 160° C. to 200° C. and contain a polyamide-based adhesive, a reduction in the material strength, such as the elastic modulus and yield strength of the adhesion layer, that is caused by a heat treatment performed after the coating with the coating composition can be suppressed, so that a reduction in the adhesiveness of the adhesion layer is inhibited. Therefore, excellent adhesion is attained between the reinforcing metal cord member and the adhesion layer as well as between the adhesion layer and the coating composition, and the multiple resin layer shows excellent durability even after a heat treatment.

From the viewpoint of the adhesion between the adhesion layer and the coating composition, the melting point of the adhesion layer is preferably from 160° C. to 190° C., more preferably from 160° C. to 180° C., still more preferably from 170° C. to 180° C. When the adhesion layer has a melting point of 190° C. or lower, a part of the adhesion layer is easily melted at the time of the coating with the coating composition, so that the adhesion is further improved.

The melting point of the adhesion layer can be adjusted based on the component constituting the adhesion layer.

(Polyamide-Based Adhesive)

The polyamide-based adhesive is an adhesive which contains no organic solvent and is heat-melted to be applied or the like and then solidified by cooling to perform adhesion. The polyamide-based adhesive can be tightly adhered even to an irregular outer circumferential surface of a reinforcing metal cord member, and the reinforcing metal cord member and the coating composition can thus be firmly fixed with each other. Accordingly, it is believed that, by arranging an adhesion layer containing the polyamide-based adhesive between the reinforcing metal cord member and the coating composition, the reinforcing metal cord member and the coating composition can be firmly fixed together and the adhesiveness of the reinforcing metal cord member to the coating composition is improved. Further, since the polyimide-based adhesive contains no organic solvent, it is not necessary to perform a solvent-drying step, and the polyimide-based adhesive is superior to organic solvent-containing adhesives from the environmental and production viewpoints as well.

The polyamide-based thermoplastic resin contained in the polyamide-based adhesive is not particularly limited. From the viewpoint of adjusting the melting point of the adhesion layer to be from 160° C. to 200° C., the polyamide-based thermoplastic resin contained as a main component is preferably one which has a melting point of 160° C. or higher.

Examples of the polyamide-based adhesive include DAI-AMID Series manufactured by Daicel-Evonik Ltd. (e.g., A6453, A6492, A6470, A6469, A6560 and CW1156), B409 manufactured by ARKEMA K.K., and NEWMIDE Series manufactured by Harima Chemicals Groups, Inc.

In the invention, the adhesion layer may contain one or plural polyamide-based adhesives.

In the polyamide-based adhesive, in addition to the thermoplastic resin contained as a main component, an additive(s) such as a tackifying resin, a softening agent (plasticizer), an antioxidant (anti-aging agent) and/or a heat stabilizer may he incorporated as required.

In the invention, the thickness (average layer thickness) of the adhesion layer is not particularly limited however, from the viewpoints of the ease of forming the adhesion layer, the adhesion performance and the like, the thickness of the adhesion layer is preferably from 5 μm to 200 μm, more preferably from 20 μm to 150 μm, particularly preferably from 20 μm to 100 μm.

The average layer thickness of the adhesion layer can be determined by the following two methods.

The first method is, for example, a method in which an operation of measuring the layer thickness of the adhesion layer at a cross-section produced by cutting a reinforcing metal cord coated with the coating composition via the adhesion layer in the direction perpendicular to the cord lengthwise direction is performed at 10 spots per 1 m of the reinforcing metal cord, and the average layer thickness is determined by taking the arithmetic mean of the thus measured values of the layer thickness of the adhesion layer at the 10 spots.

The second method is, for example, a method in which an operation of determining the layer thickness of the adhesion layer by subtracting the radius of a reinforcing metal cord yet to be provided with the adhesion layer from the radius of the reinforcing metal cord provided with the adhesion layer is performed at 10 spots per 1 m of the reinforcing metal cord, and the average layer thickness is determined by taking the arithmetic mean of the thus measured values of the layer thickness of the adhesion layer at the 10 spots.

The thickness ratio of the adhesion layer and the coating composition (adhesion layer/coating composition) is preferably from 1/20 to 10/1.

When the thickness ratio of the adhesion layer and the coating composition is 1/20 or higher, the adhesion layer is ensured to have a sufficient thickness, so that the functions of the adhesion layer are likely to be expressed and superior adhesion strength is obtained. Meanwhile, when the thickness ratio of the adhesion layer and the coating composition is 10/1 or lower, since the adhesion layer is not excessively thick, a reduction in strength at the interface between the adhesion layer and the coating composition can be inhibited, and this makes it easy for the tire to maintain sufficient durability.

From the same viewpoints as described above, the thickness ratio of the adhesion layer and the coating composition (adhesion layer/coating composition) is more preferably from 1/10 to 5/1.

[Tire Frame]

The tire frame is not particularly limited as long as it functions as a tire skeleton. For example, the tire frame is made of a material containing a resin or a rubber as a main component and formed in a circular shape. Specific examples of the tire frame includes a tire frame which includes: a pair of bead portions; a pair of side portions that continuously extend on the tire radial-direction outer side of the respective bead portions; and a crown portion that continuously extends on the tire width-direction inner side of the side portions and connects the tire radial-direction outer ends of the side portions with each other, and in which bead cores are embedded in the respective bead portions and a toroidally extending carcass is arranged between the bead cores.

The material of the tire frame is not particularly limited; however, the tire frame is usually formed from a rubber material or a resin material. Generally, the tire frame is mainly composed of a rubber material or a resin material, except for the bead cores and the reinforcing cord (e.g., organic fiber cord or steel cord) in the carcass.

From the viewpoints of weight reduction of the tire and productivity, the tire frame is preferably composed of a resin material.

[Rubber Material]

In one embodiment of the invention, the "rubber material" contains at least a rubber (rubber component) and may further contain other component such as an additive. Examples of the rubber include natural rubber, styrene-butadiene rubber, butadiene rubber, isoprene rubber, butyl rubber, and mixtures thereof.

[Resin Material]

From the viewpoint of weight reduction, the tire frame in one embodiment of the invention is preferably composed of a resin material.

In one embodiment of the invention, the "resin material" contains at least a resin (resin component) and may further contain other component such as an additive. The "resin material" preferably contains the resin component in an amount of from 50% by mass to 100% by mass. The term "resin material" used herein is a concept encompassing thermoplastic resins, thermoplastic elastomers and thermosetting resins, but does not include vulcanized rubbers.

Examples of the thermosetting resins include phenolic thermosetting resins, urea-based thermosetting resins, melamine-based thermosetting resins, and epoxy-based thermosetting resins.

Examples of the thermoplastic resins include polyamide-based thermoplastic resins, polyester-based thermoplastic resins, olefin-based thermoplastic resins, polyurethane-based thermoplastic resins, vinyl chloride-based thermoplastic resins, and polystyrene-based thermoplastic resins. These thermoplastic resins may be used singly, or in combination of two or more thereof. Thereamong, as a thermoplastic resin, at least one selected from polyamide-based thermoplastic resins, polyester-based thermoplastic resins and olefin-based thermoplastic resins is preferable, and at least one selected from polyamide-based thermoplastic resins and olefin-based thermoplastic resins is more preferable.

Examples of the thermoplastic elastomer include a polyamide-based thermoplastic elastomer (TPA), a polystyrene-based thermoplastic elastomer (TPS), a polyurethane-based thermoplastic elastomer (TPU), an olefin-based thermoplastic elastomer (TPO), a polyester-based thermoplastic elastomer (TPEE), and a crosslinked thermoplastic rubber (TPV), as well as another type of thermoplastic elastomer (TPZ) as defined according to JIS K6418: 2007. As the resin material for forming the tire frame, use of the thermoplastic resin is preferable considering the elasticity required at traveling and formability in production, and use of the thermoplastic elastomer is more preferable. Further, use of the polyamide-based thermoplastic elastomer is especially preferable when a polyamide-based thermoplastic resin is used as the thermoplastic resin for coating the reinforcing metal cord member.

—Polyamide-Based Thermoplastic Elastomer—

The polyamide-based thermoplastic elastomer means a thermoplastic resin material composed of a copolymer having: a polymer which forms a hard segment which is crystalline and has a high melting point; and a polymer which forms a soft segment which is amorphous and has a low glass transition temperature, in which the polymer which forms a hard segment has an amide bond (—CONH—) in a main chain thereof.

Examples of the polyamide-based thermoplastic elastomer include a material in which at least a polyamide forms a crystalline hard segment with a high melting point, and another polymer (such as a polyester or a polyether) forms an amorphous soft segment with a low glass transition temperature. Further, the polyamide-based thermoplastic elastomer may be composed of, in addition to a hard segment and a soft segment, a chain extender such as a dicarboxylic acid.

Specific examples of the polyamide-based thermoplastic elastomer include an amide-based thermoplastic elastomer (TPA) as defined according to JIS K6418: 2007, and a polyamide-based elastomer described in JP-A No. 2004-346273.

Examples of the polyamide forming the hard segment in the polyamide-based thermoplastic elastomer include a polyamide formed from a monomer represented by the following Formula (1) or Formula (2).

$$H_2N—R^1—COOH \hspace{2em} \text{Formula (1)}$$

[In Formula (1), R1 represents a hydrocarbon molecular chain having from 2 to 20 carbon atoms, or an alkylene group having from 2 to 20 carbon atoms.]

Formula (2)

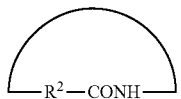

[In Formula (2), R² represents a hydrocarbon molecular chain having from 3 to 20 carbon atoms, or an alkylene group having from 3 to 20 carbon atoms]

In Formula (1), $R^1$ is preferably a hydrocarbon molecular chain having from 3 to 18 carbon atoms or an alkylene group having from 3 to 18 carbon atoms, more preferably a hydrocarbon molecular chain having from 4 to 15 carbon atoms or an alkylene group having from 4 to 15 carbon atoms, and especially preferably a hydrocarbon molecular chain having from 10 to 15 carbon atom, or an alkylene group having from 10 to 15 carbon atoms. Meanwhile, in Formula (2), $R^2$ is preferably a hydrocarbon molecular chain having from 3 to 18 carbon atoms or an alkylene group having from 3 to 18 carbon atoms, more preferably a hydrocarbon molecular chain having from 4 to 15 carbon atom, or an alkylene group having from 4 to 15 carbon atoms, and especially preferably a hydrocarbon molecular chain having from 10 to 15 carbon atoms or an alkylene group having from 10 to 15 carbon atoms.

Examples of the monomer represented by Formula (1) or Formula (2) include an ω-aminocarboxylic acid and a lactam. Further, examples of the polyamide which forms the hard segment include a polycondensate of an ω-aminocarboxylic acid, a polycondensate of a lactam, and a polycondensate of a diamine and a dicarboxylic acid.

Examples of the ω-aminocarboxylic acid include an aliphatic ω-aminocarboxylic acid having from 5 to 20 carbon atoms, such as 6-aminocaproic acid, 7-aminoheptanoic acid, 8-aminooctanoic acid, 10-aminocapric acid, 11-aminoundecanoic acid, and 12-aminododecanoic acid. Examples of the lactam include an aliphatic lactam having from 5 to 20 carbon atoms, such as lauryl lactam, ε-caprolactam, undecane lactam, ω-enantholactam, and 2-pyrrolidone.

Examples of the diamine include a diamine compound such as an aliphatic diamine having from 2 to 20 carbon atoms, including ethylenediamine, trimethylenediamine, tetramethylenediamine, hexamethylenediamine, heptamethylenediamine, octamethylenediamine, nonamethylenediamine, decamethylenediamine, undecamethylenediamine, dodecamethylenediamine, 2,2,4-trimethylhexamethylenediamine, 2,4,4-trimethylhexamethylenediamine, 3-methylpentamethylenediamine, and meta-xylylenediamine.

The dicarboxylic acid can be represented as HOOC—$(R^3)_m$—COOH ($R^3$: a hydrocarbon molecular chain having from 3 to 20 carbon atoms, m: 0 or 1), and examples thereof include an aliphatic dicarboxylic acid having from 2 to 20 carbon atoms, such as oxalic acid, succinic acid, glutaric acid, adipic acid, pimelic acid, suberic acid, azelaic acid, sebacic acid, and dodecanedioic acid.

As the polyamide forming the hard segment, a polyamide prepared by ring-opening polycondensation of lauryl lactam, ε-caprolactam, or undecane lactam can be favorably used.

Examples of the polymer which forms the soft segment include a polyester, and a polyether, and specifically, polyethylene glycol, polypropylene glycol, poly(tetramethylene ether) glycol, and an ABA-type triblock polyether. These may be used singly or in a combination of two or more kinds thereof. Further, a polyetherdiamine obtained by reacting ammonia or the like with the end of a polyether may be also used.

In this regard, the "ABA-type triblock polyether" means a polyether represented by the following Formula (3).

Formula (3)

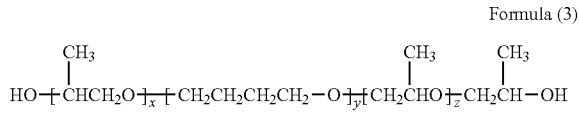

[In Formula (3), x and z each represent an integer from 1 to 20. y represents an integer from 4 to 50.]

In Formula (3), x and z are each preferably an integer from 1 to 18, more preferably an integer from 1 to 16, especially preferably an integer from 1 to 14, and most preferably an integer from 1 to 12. Further, in Formula (3), y is preferably an integer from 5 to 45, more preferably an integer from 6 to 40, especially preferably an integer from 7 to 35, and most preferably an integer from 8 to 30.

Examples of a combination of the hard segment and the soft segment include the combinations of the respective hard segment and the respective soft segment described above. Among them, as the combination of the hard segment and the soft segment, a combination of a ring-opening polycondensate of lauryl lactam and poly(ethylene glycol), a combination of a ring-opening polycondensate of lauryl lactam and poly(propylene glycol), a combination of a ring-opening polycondensate of lauryl lactam and poly(tetramethylene ether) glycol, and a combination of a ring-opening polycondensate of lauryl lactam and an ABA-type triblock polyether are preferable, and a combination of a ring-opening polycondensate of lauryl lactam and an ABA type triblock polyether is especially preferable.

The number average molecular weight of the polymer forming the hard segment of the polyamide-based thermoplastic elastomer (i.e. polyamide) is preferably from 300 to 15,000 from a viewpoint of melt-formability. Meanwhile, the number average molecular weight of the polymer forming the soft segment is preferably from 200 to 6,000 from viewpoints of toughness and low temperature flexibility. Further, the mass ratio (x/y) of the hard segment (x) to the soft segment (y) is preferably from 50/50 to 90/10, and more preferably from 50/50 to 80/20, from a viewpoint of formability.

The polyamide-based thermoplastic elastomer can be synthesized by copolymerizing the polymer for forming the hard segment and the polymer for forming the soft segment by a publicly known method.

As a commercial product for the polyamide-based thermoplastic elastomer, for example, "UBE STA XPA" series (for example. XPA9063X1, XPA9055X1, XPA9048X2, XPA9048X1, XPA9040X1, and XPA9040X2XPA9044) from UBE Industries, Ltd., "VESTAMID" series (for example, E40-S3, E47-S1, E47-S3, E55-S1, E55-S3, EX9200, and E50-R2), from Daicel-Evonik Ltd., or the like may be used.

Since the polyamide-based thermoplastic elastomer satisfies the performance required for a tire frame in terms of elastic modulus (flexibility), strength and the like, it is suitable as a resin material. Further, the polyamide-based thermoplastic elastomer is preferable since it shows favorable adhesion with the polyamide-based thermoplastic resin having a melting point of 160° C. or higher or the polyamide-based thermoplastic elastomer having a melting point of 160° C. or higher that is contained in the coating composition.

—Polystyrene-Based Thermoplastic Elastomer—

Examples of the polystyrene-based thermoplastic elastomer include a material, in which at least polystyrene forms a hard segment, and another polymer (for example, polybutadiene, polyisoprene, polyethylene, hydrogenate polybutadiene, and hydrogenate polyisoprene) forms an amorphous soft segment with a low glass transition temperature. As the polystyrene which forms the hard segment, for example, one yielded by a publicly known method, such as a radical polymerization method or an ionic polymerization method, is favorably used, and one of specific examples is polystyrene having an anionic living polymer form. Examples of a polymer forming the soft segment include polybutadiene, polyisoprene, and poly(2,3-dimethylbutadiene).

Examples of a combination of the hard segment and the soft segment include the combinations of the respective hard segment and the respective soft segment described above. Among them, as the combination of the hard segment and the soft segment, a combination of polystyrene and polybutadiene, and a combination of polystyrene and polyisoprene is preferable. Further, the soft segment is preferably hydrogenated, so as to suppress unintended crosslinking of a thermoplastic elastomer.

The number average molecular weight of the polymer (polystyrene) forming the hard segment is preferably from 5,000 to 500,000, and more preferably from 10,000 to 200,000. Meanwhile, the number average molecular weight of the polymer forming the soft segment is preferably from 5,000 to 1,000,000, more preferably from 10,000 to 800,000, and especially preferably from 30,000 to 500,000, Further, the volume ratio (x:y) of a hard segment (x) to a soft segment (y) is preferably from 5:95 to 80:20, and more preferably from 10/90 to 70/30, from a viewpoint of formability.

The number-average molecular weight can be measured by gel permeation chromatography (GPC) using, for example, a GPC (gel permeation chromatography) system such as "HLC-8320GPC EcoSEC" manufactured by Tosoh Corporation.

The polystyrene-based thermoplastic elastomer can be synthesized by copolymerizing the polymer for forming the hard segment and the polymer for forming the soft segment by a publicly known method.

Examples of the polystyrene-based thermoplastic elastomer include a styrene/butadiene-based copolymer [SBS (polystyrene-poly(butylene) block-polystyrene), SEBS (polystyrene-poly(ethylene/butylene) block-polystyrene)], a styrene-isoprene copolymer (polystyrene-polyisoprene block-polystyrene), a styrene/propylene-based copolymer [SEP (polystyrene-(ethylene/propylene) block), SEPS (polystyrene-poly(ethylene/propylene) block-polystyrene), SEEPS (polystyrene-poly(ethylene-ethylene/propylene) block-polystyrene), SEB (polystyrene (ethylene/butylene) block)].

As a commercial product for the polystyrene-based thermoplastic elastomer, for example, "TUFTEC" series (for example, H1031, H1041, H1043, H1051, H1052, H1053, H1062, H1082, H1141, H1221, and H1272) produced by Asahi Kasei Corporation, and "SEGS" series (8007, 8076, etc.),"SEPS" series (2002, 2063, etc.), etc. produced by Kuraray Co., Ltd. may be used.

—Polyurethane-Based Thermoplastic Elastomer—

With respect to the polyurethane-based thermoplastic elastomer, for example, there is a material in which at least polyurethane forms a hard segment with pseudo-crosslinks formed by physical aggregation, and another polymer forms an amorphous soft segment with a low glass transition temperature.

Specific examples of the polyurethane-based thermoplastic elastomer include a polyurethane-based thermoplastic elastomer (TPU) as defined according to JIS K6418: 2007. A polyurethane-based thermoplastic elastomer can be represented as a copolymer including a soft segment containing a unit structure represented by the following Formula A, and a hard segment containing a unit structure represented by the following Formula B.

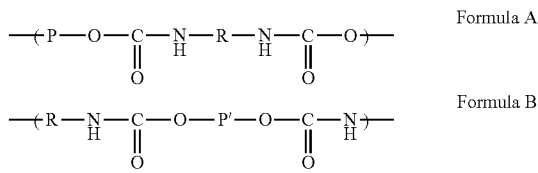

[In Formulae, P represents a long-chain aliphatic polyether or a long-chain aliphatic polyester. R represents an aliphatic hydrocarbon, an alicyclic hydrocarbon, or an aromatic hydrocarbon. P' represents a short chain aliphatic hydrocarbon, an alicyclic hydrocarbon, or an aromatic hydrocarbon.]

As the long-chain aliphatic polyether or the long-chain aliphatic polyester represented by P in Formula A, for example, that with a molecular weight of from 500 to 5,000 may be used. P is originated from a diol compound containing a long-chain aliphatic polyether or a long-chain aliphatic polyester represented as P. Examples of such a diol compound include polyethylene glycol, polypropylene glycol, poly(tetramethylene ether) glycol, poly(butylene adivate) diol, poly-ϵ-caprolactone diol, poly(hexamethylene carbonate) diol, and an ABA-type triblock polyether, molecular weight of which being within the above range.

These may be used singly or in a combination of two or more kinds thereof.

R in Formula A and Formula B is originated from a diisocyanate compound containing an aliphatic hydrocarbon, an alicyclic hydrocarbon, or an aromatic hydrocarbon represented by R. Examples of the aliphatic diisocyanate compound containing an aliphatic hydrocarbon represented by R include 1,2-ethylene diisocyanate, 1,3-propylene diisocyanate, 1,4-butane diisocyanate, and 1,6-hexamethylene diisocyanate.

Examples of the diisocyanate compound containing an alicyclic hydrocarbon represented by R include 1,4-cyclohexane diisocyanate and 4,4-cyclohexane diisocyanate. Further, examples of the aromatic diisocyanate compound containing an aromatic hydrocarbon represented by R include 4,4'-diphenyl methane diisocyanate and tolylene diisocyanate.

These may be used singly or in a combination of two or more kinds thereof.

As the short chain aliphatic hydrocarbon, the alicyclic hydrocarbon, or the aromatic hydrocarbon represented by P' in Formula B, for example, that having a molecular weight of smaller than 500 may be used. P' is originated from a diol compound containing a short chain aliphatic hydrocarbon, an alicyclic hydrocarbon, or an aromatic hydrocarbon represented by P'. Examples of the aliphatic diol compound containing a short chain aliphatic hydrocarbon represented by P' include glycol, and a polyalkylene glycol, and specifically include ethylene glycol, propylene glycol, trimethylene glycol, 1,4-butanediol, 1,3-butanediol, 1,5-pentane diol, 1,6-hexane diol, 1,7-heptane diol, 1,8-octane diol, 1,9-nonane diol, and 1,10-decane diol.

Examples of the alicyclic diol compound containing an alicyclic hydrocarbon represented by P' include cyclopentane-1,2-diol, cyclohexane-1,2-diol, cyclohexane-1,3-diol, cyclohexane-1,4-diol and cyclohexane-1,4-dimethanol.

Further, examples of the aromatic diol compound containing an aromatic hydrocarbon represented by P' include hydroquinone, resorcinol, chlorohydroquinone, bromohydroquinone, methylhydroquinone, phenylhydroquinone, methoxyhydroquinone, phenoxyhydroquinone, 4,4'-dihydroxybiphenyl, 4,4'-dihydroxydiphenyl ether, 4,4'-dihydroxydiphenyl sulfide, 4,4'-dihydroxydiphenyl sulfone, 4,4'-dihydroxybenzophenone, 4,4'-dihydroxydiphenyl methane, bisphenol A, 1,1-di(4-hydroxyphenyl)cyclohexane, 1,2-bis (4-hydroxyphenoxy)ethane, 1,4-dihydroxynaphthalene, and 2,6-dihydroxynaphthalene.

These may be used singly or in a combination of two or more kinds thereof.

From the viewpoint of melt-moldability, the number-average molecular weight of the polymer (i.e., polyurethane) constituting the hard segment is preferably from 300 to 1,500. Further, from the viewpoints of the flexibility and thermal stability of the polyurethane-based thermoplastic elastomer, the number-average molecular weight of the polymer constituting the soft segment is preferably from 500 to 20,000, more preferably from 500 to 5,000, particularly preferably from 500 to 3,000, From the moldability viewpoint, the mass ratio (x:y) of the hard segment (x) and the soft segment (y) is preferably from 15:85 to 90:10, more preferably from 30:70 to 90:10.

The number-average molecular weight can be measured by the above-described method.

Alternatively, when the number-average molecular weight cannot be measured by gel permeation chromatography (GPC), the molecular weight may be measured using nuclear magnetic resonance (NMR).

Specifically, the measurement subject, which is the polymer constituting the hard segment or the polymer constituting the soft segment, is dissolved in deuterated trifluoroacetic acid, and $^1$H-NMR and $^{13}$C-NMR are measured in accordance with a conventional method. Then, functional groups are each assigned, and the structure of the polymer constituting the hard segment or the polymer constituting the soft segment is identified, whereby the molecular weight can be determined.

The polyurethane-based thermoplastic elastomer can be synthesized by copolymerizing the polymer for forming the hard segment and the polymer for forming the soft segment by a publicly known method. As the polyurethane-based thermoplastic elastomer, for example, a thermoplastic polyurethane described in JP-A No. H05-331256 can be used.

As the polyurethane-based thermoplastic elastomer, specifically, a combination of a hard segment composed of an aromatic diol and an aromatic diisocyanate and a soft segment composed of a polycarbonate ester is preferable, and more specifically at least one kind selected from a tolylene diisocyanate (TDI)/polyester-based polyol copolymer, a TDI/polyether-based polyol copolymer, a TDI/caprolactone-based polyol copolymer, a TDI/polycarbonate-based polyol copolymer, a 4,4'-diphenyl methane diisocyanate (MDI)/polyester-based polyol copolymer, a MDI/polyether-based polyol copolymer, a MDI/caprolactone-based polyol copolymer, a MDI/polycarbonate-based polyol copolymer, or a MDI+hydroquinone/poly(hexamethylene carbonate) copolytner is preferable, and at least one kind selected from a TDI/polyester-based polyol copolymer, a TDI/polyether-based polyol copolymer, a MDI/polyester polyol copolymer, a MDI/polyether-based polyol copolymer, or a MDI+hydroquinone/poly(hexamethylene carbonate) copolymer is more preferable.

As a commercial product for the polyurethane-based thermoplastic elastomer, for example, "ELASTOLLAN" series (for example, ET680, ET880, ET690, and ET890) produced by BASF SE, "KURAMILON U" series (for example, 2000s, 3000s, 8000s, and 9000s) produced by Kuraray Co., Ltd., and "MIRACTRAN" series (for example, XN-2001, XN-2004, P390RSUP, P480RSUI, P26MRNAT, E490, E590, and P890) produced by Nippon Miractran Co., Ltd. may be used.

—Olefin-Based Thermoplastic Elastomer—

Examples of the olefin-based thermoplastic elastomer include a material in which at least a polyolefin forms a crystalline hard segment with a high melting point, and another polymer (for example, polyolefin, another polyolefin, and polyvinyl compound) forms an amorphous soft segment with a low glass transition temperature. Examples of the polyolefin forming a hard segment include polyethylene, polypropylene, isotactic polypropylene, and polybutene.

Examples of the olefin-based thermoplastic elastomer include an olefin-α-olefin random copolymer and an olefin block copolymer, and specifically include a propylene block copolymer, an ethylene-propylene copolymer, a propylene-1-hexene copolymer, a propylene-4-methyl-1-pentene copolymer, a propylene-1-butene copolymer, an ethylene-1-hexene copolymer, an ethylene-4-methylpentene copolymer, an ethylene-1-butene copolytner, a 1-butene-1-hexene copolymer, 1-butene-4-methylpentene, an ethylene-methacrylic acid copolymer, an ethylene-methyl methacrylate copolymer, an ethylene: ethyl methacrylate copolymer, an ethylene-butyl methacrylate copolytner, an ethylene-methyl acrylate copolymer, an ethylene-ethyl acrylate copolymer, an ethylene-butyl acrylate copolymer, a propylene-methacrylic acid copolymer, a propylene-methyl methacrylate copolymer, a propylene-ethyl methacrylate copolymer, a propylene-butyl methacrylate copolymer, a propylene-methyl acrylate copolymer, a propylene-ethyl acrylate copolymer, a propylene-butyl acrylate copolymer, an ethylene-vinyl acetate copolymer, and a propylene-vinyl acetate copolymer.

Among them, as the olefin-based thermoplastic elastomer, at least one kind selected from a propylene block copolymer, an ethylene-propylene copolymer, a propylene-1-hexene copolymer, a propylene-4-methyl-1-pentene copolymer, a propylene-1-butene copolymer, an ethylene-1-hexene copolymer, an ethylene-4-methylpentene copolymer, an ethylene-1-butene copolymer, an ethylene-methacrylic acid copolymer, an ethylene-methyl methacrylate copolymer, an ylene-ethyl methacrylate copolymer, an ethylene-butyl methacrylate copolymer, an ethylene-methyl acrylate copolymer, an ethylene-ethyl acrylate copolymer, an ethylene-butyl acrylate copolymer, a propylene-methacrylic acid copolymer, a propylene-methyl methacrylate copolymer, a propylene-ethyl methacrylate copolymer, a propylene-butyl methacrylate copolymer, a propylene-methyl acrylate copolymer, a propylene-ethyl acrylate copolymer, a propylene-butyl acrylate copolymer, an ethylene-vinyl acetate copolymer, or a propylene-vinyl acetate copolymer is preferable, and at least one kind selected from an ethylene-propylene copolymer, a propylene-1-butene copolymer, an ethylene-1-butene copolymer, an ethylene-methyl methacrylate copolymer, an ethylene-methyl acrylate copolymer, an ethylene-ethyl acrylate copolymer, or an ethylene-butyl acrylate copolymer is more preferable.

A combination of two or more kinds of the olefin-based resins, such as ethylene and propylene may be used. The content of an olefin-based resin in an olefin-based thermoplastic elastomer is preferably from 50 mass-% to 100 mass-%.

The number average molecular weight of the olefin-based thermoplastic elastomer is preferably from 5,000 to 10,000,000. When the number average molecular weight of the olefin-based thermoplastic elastomer is from 5,000 to 10,000,000, the mechanical properties of a thermoplastic resin material can be adequate, and processability thereof is also superior. From a similar viewpoint, the number average molecular weight of an olefin-based thermoplastic elastomer is more preferably from 7,000 to 1,000,000, and especially preferably from 10,000 to 1,000,000. In this case, the mechanical properties and processability of the thermoplastic resin material can be improved. Meanwhile, the number average molecular weight of the polymer forming the soft segment is preferably from 200 to 6,000 from viewpoints of toughness and low temperature flexibility. Further, the mass ratio (x:y) of a hard segment (x) to a soft segment (y) is preferably from 50:50 to 95:15, and more preferably from 50:50 to 90:10, from a viewpoint of formability.

An olefin-based thermoplastic elastomer can be synthesized through copolymerization by a publicly known method.

The number-average molecular weight can be measured by the above-described method.

As the olefin-based thermoplastic elastomer, a thermoplastic elastomer which has been acid-modified may be used.

The "olefin-based thermoplastic elastomer which has been acid-modified" means an olefin-based thermoplastic elastomer which has been bonded with an unsaturated compound having an acidic group, such as a carboxylic acid group, a sulfate group, or a phosphate group.

For bonding the unsaturated compound having an acidic group, such as a carboxylic acid group, a sulfate group, or a phosphate group to the olefin-based thermoplastic elastomer, for example, an unsaturated bond site of an unsaturated carboxylic acid (generally maleic anhydride) as an unsaturated compound having an acidic group is bonded (for example, grafted) to an olefin-based thermoplastic elastomer.

As the unsaturated compound having an acidic group, an unsaturated compound having a carboxylic acid group, which is a weak acidic group, is preferable from a viewpoint of suppression of deterioration of the olefin-based thermoplastic elastomer, and examples thereof include acrylic acid, methacrylic acid, itaconic acid, crotonic acid, isocrotonic acid, and maleic acid.

As a commercial product for the olefin-based thermoplastic elastomer, for example, "TAFMER" series (for example, A0550S, A1050S, A4050S, A1070S, A4070S, A35070S, A1085S, A4085S, A7090, A70090, MH7007, MH7010, XM-7070, XM-7080, BL4000, BL2481, BL3110, BL3450, P-0275, P-0375, P-0775, P-0180, P-0280, P-0480, and P-0680) produced by Mitsui Chemicals, Inc., "NUCREL" series (for example, AN4214C, AN4225C, AN42115C, N0903HC, N0908C, AN42012C, N410, N1050H, N1108C, N1110H, N1207C, N1214, AN4221C, N1525, N1560, N0200H, AN4228C, AN4213C, and N035C), and "ELVALOY AC" series (for example, 1125AC, 1209AC, 1218AC, 1609AC, 1820AC, 1913AC, 2112AC, 2116AC, 2615AC, 2715AC, 3117AC, 3427AC, and 3717AC), produced by Dupont-Mitsui Polychemicals Co., Ltd., "ACRYFT" series, "EVATATE" series, etc. from Sumitomo Chemical Co., Ltd., "ULTRATHENE" series, etc. produced by Tosoh Corporation, "PRIME TPO" series (for example, E-2900H, F-3900H, E-2900, F-3900, J-5900, E-2910, F-3910, J-5910, E-2710, F-3710, J-5910, E-2740, F-3740, R110MP, R110E, T310E, and M142E) produced by Prime Polymer Co., Ltd., etc. may he used.

—Polyester-Based Thermoplastic Elastomer—

Examples of the polyester-based thermoplastic elastomer include a material in which at least a polyester forms a crystalline hard segment with a high melting point, and another polymer (for example, polyester, or polyether) forms an amorphous soft segment with a low glass transition temperature.

As the polyester forming the hard segment, an aromatic polyester can be used. The aromatic polyester can be formed, for example, from an aromatic dicarboxylic acid, or an ester-forming derivative thereof, and an aliphatic diol. The aromatic polyester is preferably a poly(butylene terephthalate) derived from terephthalic acid and/or dimethyl terephthalate, and 1,4-butanediol, and further may be a polyester derived from a dicarboxylic acid component and a diol with a molecular weight of 300 or less, examples of the dicarboxylic acid component of which including isophthalic acid, phthalic acid, naphthalene-2,6-dicarboxylic acid, naphthalene-2,7-dicarboxylic acid, diphenyl-4,4'-dicarboxylic acid, diphenoxyethane dicarboxylic acid, 5-sulfoisophthalic acid, and an ester-forming derivative thereof, and examples of the diol with a molecular weight of 300 or less of which including an aliphatic diol such as ethylene trimethylene glycol, penta methylene glycol, hexamethylene glycol, neopentyl glycol, or decamethylene glycol, an alicyclic diol such as 1,4-cyclohexane dimethanol, or tricyclodecane dimethylol, and an aromatic diol such as xylylene glycol, bis(p-hydroxy)diphenyl, bis(p-hydroxyphenyl)propane, 2,2-bis[4-(2-hydroxyethoxy)phenyl]propane, bis[4-(2-hydroxy)phenyl]sulfone, 1,1-bis[4-(2-hydroxyethoxy)phenyl]cyclohexane, 4,4'-dihydroxy-p-terphenyl, or 4,4'-dihydroxy-p-quaterphenyl; or a copolyester combining two or more kinds of the dicarboxylic acid components and the diol components. Further, it is possible to copolymerize a multifunctional carboxylic acid component, a multifunctional hydroxy acid component, a multifunctional hydroxy component, and the like with three or more functional groups in a range of 5 mol-% or less.

Examples of the polyester forming the hard segment include poly(ethylene terephthalate), poly(butylene terephthalate), poly(methylene terephthalate), poly(ethylene naphthalate) and poly(butylene naphthalate), and poly(butylene terephthalate) is preferable.

Examples of the polymer forming the soft segment include, an aliphatic polyester and an aliphatic polyether.

Examples of the aliphatic polyether include poly(ethylene oxide) glycol, poly(propylene oxide) glycol, poly(tetramethylene oxide) glycol, poly(hexamethylene oxide) glycol, a copolymer of ethylene oxide and propylene oxide, an ethylene oxide addition polymer of poly(propylene oxide) glycol, and a copolymer of ethylene oxide and tetrahydrofuran. Examples of the aliphatic polyester include poly($\epsilon$-caprolactone), polyenantholactone, polycaprylolactone, poly(butylene adipate), and poly(ethylene adipate).

Among the aliphatic polyethers and the aliphatic polyesters, as the polymer forming the soft segment, poly(tetramethylene oxide) glycol, an ethylene oxide addition product of poly(propylene oxide) glycol, poly($\epsilon$-caprolactone), poly(butylene adipate), and poly(ethylene adipate), and the like are preferable from a viewpoint of the elasticity characteristic of an obtained polyester block copolymer.

The number average molecular weight of the polymer forming the soft segment is preferably from 300 to 6,000 from viewpoints of toughness and low temperature flexibility. Further, the mass ratio (x:y) of a hard segment (x) to a soft segment (y) is preferably from 99:1 to 20:80 from a viewpoint of formability, and more preferably from 98:2 to 30:70.

The number average molecular weight can be measured according to a procedure described above.

Examples of a combination of the hard segment and the soft segment include the combinations of the respective hard segment and the respective soft segment described above. Among them, as the combination of the hard segment and the soft segment a combination of poly(butylene terephthalate) as a hard segment and an aliphatic polyether as a soft segment is preferable, and a combination of poly(butylene terephthalate) as a hard segment and poly(ethylene oxide) glycol as a soft segment is more preferable.

As a commercial product for the polyester-based thermoplastic elastomer, for example. "HYTREL" series (for example. 3046, 5557, 6347, 4047, and 4767) from Du Pont-Toray Co., Ltd., and "PELPRENE" series (for example. P30B, P40B, P40E1, P55B, P70B, P150B, P280B, P450B, P150M, S1001, S2001, S5001, S6001, and S9001) produced by Toyobo Co., Ltd, may be used.

The polyester-based thermoplastic elastomer can be synthesized by copolymerizing the polymer for forming the hard segment and the polymer for forming the soft segment by a publicly known method.

Although the melting point of the resin material for forming the tire frame is ordinarily from approximately 100° C. to 350° C., from viewpoints of the durability and productivity of a tire it is preferably from approximately 100° C. to 250° C., and more preferably from 100° C. to 200° C.

The resin material may, if necessary, contain (be blended with) various additives, such as a rubber, an elastomer, a thermoplastic resin, various fillers (for example, silica, calcium carbonate, and clay), an anti-aging agent, an oil, a plasticizer, a colorant, or a weather resistant agent.

The tensile modulus as set forth in JIS K7113: 1995 of the resin material (or tire frame) itself is preferably from 50 MPa to 1,000 MPa, more preferably from 50 MPa to 800 MPa, and especially preferably from 50 MPa to 700 MPa. When the tensile modulus of the resin material is from 50 MPa to 1,000 MPa, fitting thereof onto a rim can be performed efficiently, while the shape of the tire frame is maintained.

The tensile strength as set forth in JIS K7113: 1995 of the resin material (or tire frame) itself is ordinarily from approximately 15 MPa to 70 MPa, preferably from 17 MPa to 60 MPa, and more preferably from 20 MPa to 55 MPa.

The tensile yield strength as set forth in JIS K7113: 1995 of the resin material (or tire frame) itself is preferably 5 MPa or more, more preferably from 5 MPa to 20 MPa, and especially preferably from 5 MPa to 17 MPa. When the tensile yield strength of the resin material is 5 MPa or more, the tire can be resistant to deformation by a load applied thereto at traveling and the like.

The tensile yield elongation as set forth in JIS K7113: 1995 of the resin material (or tire frame) itself is preferably 10% or more, more preferably from 10% to 70%, and especially preferably from 15% to 60%. When the tensile yield elongation of the resin material is 10% or more, the elastic region can be broad and the fittability thereof onto a rim can be high.

The tensile elongation at break as set forth in JIS K7113: 1995 of the resin material (or tire frame) itself is preferably 50% or more, more preferably 100% or more, especially preferably 150% or more, and most preferably 200% or more. When the ensile elongation at break of the resin material is 50% or more, the rim fittability is favorable, and the crash resistance at collision can be high.

The deflection temperature under load (at a load of 0.45 MPa) as set forth in ISO 75-2 or ASTM D648 of the resin material (or tire frame) itself is preferably 50° C. or more, more preferably from 50° C. to 150° C., and especially preferably from 50° C. to 130° C. When the deflection temperature under load of the resin material is 50° C. or more, deformation of the tire frame can be suppressed, even in a case in which vulcanization is performed in production of a tire.

With respect to a tire according to the invention, the Martens hardness of the tire frame (d1), the Martens hardness of a coating composition (d2), and the Martens hardness of an adhesion layer (d3) preferably satisfy the relationship d1<d2<d3. When the Martens hardness of the coating composition is set lower than the Martens hardness of an adhesion layer and higher than or equal to the Martens hardness of thea tire frame, a stiffness difference between the resin material composing the tire frame and the reinforcing metal cord member can be mitigated. As the result, the durability of the tire can be improved.

The Martens hardness can be measured by the method prescribed in ISO14577-1.

Hereinafter, the tire according to embodiments of the invention will be described with reference to the accompanying drawings. Note that each drawing described below (FIG. 1, FIG. 2, FIG. 3, and FIG. 4) are schematic, and sizes and shapes of components are illustrated figuratively as appropriate in order to facilitate understanding.

[First Embodiment]

Figure 1B:
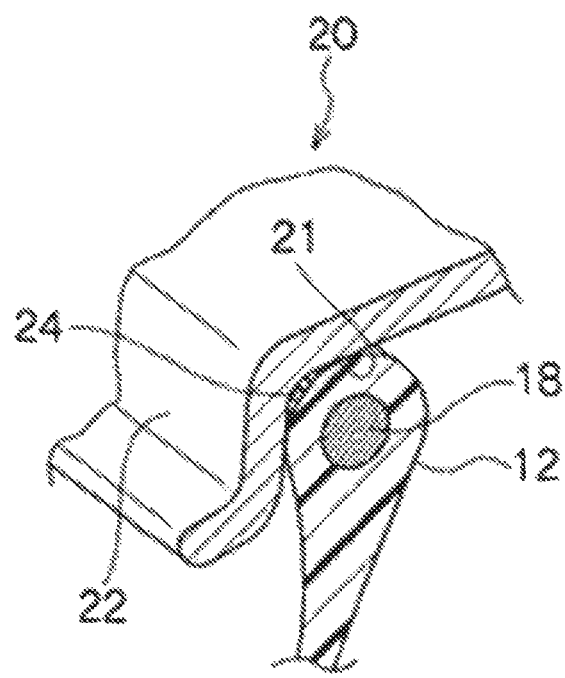
FIG. 1B is a cross-sectional view of a bead portion fitted to a rim.

First, a tire 10 according to a first embodiment of the invention will be explained with reference to FIG. 1A is a perspective view illustrating a cross-section of a portion of the tire according to the first embodiment of the invention. FIG. 1B is a cross-sectional view of a bead portion that has been fitted onto a rim. As illustrated in FIG. 1A, the tire 10 according to the first embodiment has a cross-sectional shape substantially similar to cross-sectional shapes of ordinary rubber-made pneumatic tires.

The tire 10 according to the first embodiment of the invention includes a tire frame 17 including a pair of bead portions 12 each of which is in contact with a bead seat 21 and a rim flange 22 of a rim 20, side portions 14 that respectively extend tire radial direction outward from the bead portions 12, and a crown portion 16 that connects a tire radial direction outer end of one of the side portions 14 with a tire radial direction outer end of the other side portion 14. The tire frame 17 is formed using a resin material including a polyimide-based thermoplastic elastomer.

In the tire 10 according to the first embodiment of the invention, the tire frame 17 is formed by configuring identical annular tire frame half parts 17A (tire frame pieces) in which one of the bead portions 12, one of the side portions 14, and the half-width crown portion 16 are integrally injection molded to be aligned to face each other and to be bonded to each other at a tire equatorial plane portion.

In each bead portion 12 of the tire 10 according to the first embodiment of the invention, an annular bead core 18 made of a steel cord is embedded in a manner similar to ordinary pneumatic tires. At a portion of each bead portion 12 in contact with the rim 20, and at least at a portion of each bead portion 12 in contact with the rim flange 22 of the rim 20, an annular sealing layer 24 made of a rubber that is a material having a sealing property superior to that of the resin material forming the tire frame 17 is formed.

On the crown portion 16 of the tire 10 according to the first embodiment of the invention, a resin-coated cord 26, which corresponds to a metal reinforcing cord, is wound in a helical shape in a circumferential direction of the tire frame 17 such that at least a portion thereof is embedded in the crown portion 16 in a cross-sectional view taken along an axial direction of the tire frame 17. At a tire radial direction outer circumferential side of the resin-coated cord 26, a tread 30 made of a rubber that is a material having abrasion resistance superior to that of the resin material forming the tire frame 17 is disposed. The resin-coated cord 26 will be described in detail below According to the tire 10 according to the first embodiment of the invention, the tire frame 17 is formed of the resin material. Therefore, in contrast to a conventional frame in which a tire frame is formed of a rubber, vulcanization is unnecessary, thereby enabling manufacturing processes to be greatly simplified and enabling molding time to be reduced. According to the tire 10 according to the first embodiment of the invention, the tire frame half parts 17A are each formed in a left-right symmetrical shape, in other words, one of the tire frame half parts 17A is formed in the same shape as the other of the tire frame half parts 17A. Therefore, there is an advantage that one type of mold suffices for molding the tire frame half parts 17A.

In the tire 10 according to the first embodiment of the invention, the tire frame 17 is formed with a single resin material. However, the invention is not limited to such an embodiment, and similarly to ordinary conventional rubber-made pneumatic tires, resin materials having characteristics different with respect to each of components of the tire frame 17 (such as the side portions 14, the crown portion 16 and the bead portions 12) may be employed. The tire frame 17 may be reinforced by a reinforcing material by embedding the reinforcing material (such as fibers, cord, nonwoven fabric, or woven fabric of a polymer material or metal) in each of the components of the tire frame 17 (for example, in the bead portions 12 the side portions 14, the crown portion 16, and the like).

In the tire 10 according to the first embodiment of the invention, the tire frame half parts 17A are each molded by injection molding. However, the invention is not limited thereto, and the tire frame half parts may be molded, for example, by vacuum molding, pressure molding, injection molding, melt casting, or the like. In the tire 10 according to the first embodiment of the invention, the tire frame 17 is formed by bonding two members (the tire frame half parts 17A) to each other. However, the invention is not limited thereto, and the tire frame may be formed as one member by a melted core method using a low melting point metal, a split core method, or a blow molding, and may be formed by bonding three or more members to each other In each bead portion 12 of the tire 10 according to the first embodiment of the invention, the annular bead core 18 made of a steel cord is embedded. The bead cores 18 may also be formed of, other than steel cord, for example, organic fiber cord, organic fiber cord coated with a resin, or a hard resin. Note that the bead cores 18 may be omitted as long as the rigidity of the bead portions 12 is assured and there is no problem in fitting onto the rim 20.

In the tire 10 according to the first embodiment of the invention, an annular sealing layer 24 made of a rubber is formed at a portion of each bead portion 12 in contact with the rim 20 and at least at a portion of each bead portion 12 in contact with the rim flange 22 of the rim 20. The seal layers 24 may also be formed at portions where the bead portions 12 that is a part of the tire frame 17 and the bead seats 21 are in contact with each other. In a case in which a rubber is employed as a material for forming the seal layers 24, the rubber is preferably of the same type as the rubber employed on bead portion outer surfaces of ordinary conventional rubber-made pneumatic tires. Note that the rubber seal layers 24 may also be omitted as long as a sealing property relative to the rim 20 can be assured only with the resin material forming the tire frame 17.

Further, the seal layers 24 may also be formed using other thermoplastic resin or thermoplastic elastomer having a sealing property superior to that of the resin material forming the tire frame 17. Examples of such other thermoplastic resins include resins such as polyurethane-based resins, polyolefin-based resins, polystyrene-based resins, polyester resins, and blends of these resins with a rubber or elastomer. A thermoplastic elastomer may also be employed, and examples include polyester-based thermoplastic elastomers, polyurethane-based thermoplastic elastomers, polystyrene-based thermoplastic elastomers, polyolefin-based thermoplastic elastomers, a combination of such elastomers with each other, and a blend thereof with a rubber.

Figure 2:
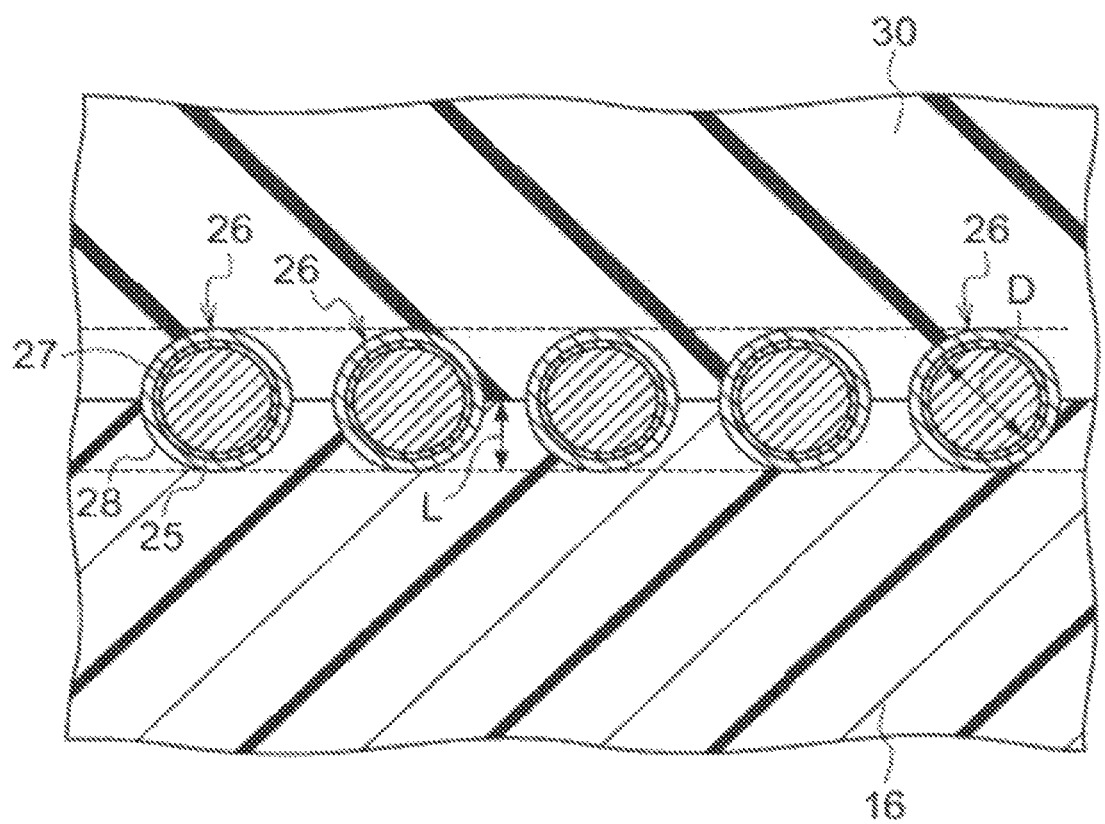
FIG. 2 is a cross-sectional view taken along the tire rotation axis, which illustrates a state in which a resin-coated cord is embedded in the crown portion of a tire frame of a tire according to a first embodiment.

Next, the resin-coated cord 26 will be described with reference to FIG. 2. FIG. 2 is a cross-sectional view taken along a tire rotation axis of the tire according to the first embodiment of the invention and illustrating a state in which the resin-coated cord is embedded in the crown portion of the tire frame.

As illustrated in FIG. 2, in the tire 10 according to the first embodiment of the invention, the resin-coated cord 26 is wound in a helical shape such that at least a portion thereof is embedded in the crown portion 16 in a cross-sectional view taken along the axial direction of the tire frame 17. The portion of the reinforcing cord 26 embedded in the crown portion 16 is in close contact with the resin material forming the crown portion 16 (i.e., a part of the tire case 17). The L in FIG. 2 refers to a depth at which the resin-coated cord 26 is embedded with respect to the crown portion 16 along a tire rotation axis direction. The embedding depth L of the resin-coated cord 26 with respect to the crown portion 16 is ½ of a diameter D of the resin-coated cord 26.

In the tire 10 according to the first embodiment of the invention, the resin-coated cord 26 has a structure in which, an outer circumference of the steel cord 27 having a steel cord (i.e. a reinforcing metal cord member) 27 of twisted steel fibers acting as a core is coated with a coating composition, via an adhesion layer 25 having a melting point of from 160° C. to 200° C. and including a polyamide-based resin, that includes a polyimide-based thermoplastic elastomer having a melting point of from 160° C. to 240° C. At the tire radial direction outer circumferential side of the resin-coated cord 26, the rubber-made tread 30 is disposed. A tread pattern of plural grooves is formed in a road surface contact surface of the tread 30, similarly to conventional rubber-made pneumatic tires.

In the tire 10 according to the first embodiment of the invention, the resin-coated cord 26 is configured such that the entirety of the outer circumference of the steel cord 27, that is formed of twisted steel fibers, is covered by, via the adhesion layer 25 having a melting point of from 160° C. to 200° C. and including an adhesive containing a polyamide-based resin, the coating composition that includes a polyamide-based thermoplastic elastomer having a melting point of from 160° C. to 240° C. The resin-coated cord 26 is embedded in the tire frame 17 formed of the resin material including a polyamide-based thermoplastic elastomer of the same type while being in close contact therewith. Accordingly, the contact area between the coating composition 28, that coats the steel cord 27, and the tire frame 17 increases, and the adhesion durability between the resin-coated cord 26 and the tire frame 17 is improved so that the durability of the tire becomes excellent.

While the embedding depth L of the resin-coated cord 26 with respect to the crown portion 16 is ½ of a diameter D of the resin-coated cord 26 in the tire 10 according to the first embodiment of the invention, the embedding depth L of the resin-coated cord 26 is preferably ⅕ or more, and particularly preferably above ½ of the diameter D of the resin-coated cord 26. Further, it is most preferable that the entirety of the resin-coated cord 26 is embedded in the crown portion 16. In a case in which the embedding depth L of the resin-coated cord 26 is above ½ of the diameter D of the resin-coated cord 26, the resin-coated cord 26 becomes unlikely to protrude from an embedded portion in view of the size of the resin-coated cord 26. Embedding the entirety of the resin-coated cord 26 in the crown portion 16 makes a surface (outer circumferential surface) to be flat, and suppresses incorporation of air in a peripheral portion of the resin-coated cord 26 even in a case in which any member is placed on the crown portion 16 in which the reinforcing cord 26 is embedded.

A thickness of the resin multiple layer that coats the steel cord 27 is not particularly limited, and an average layer thickness may be preferably from 0.2 mm to 4.0 mm, more preferably from 0.5 mm to 3.0 mm, and particularly preferably from 0.5 mm to 2.5 mm.

While the tread 30 is formed of a rubber in the tire 10 according to the first embodiment of the invention, a tread may be employed that is formed of, in place of a rubber, another kind of thermoplastic resin material superior to the resin material forming the tire frame 17 in terms of abrasion resistance.

Hereinafter, a method of manufacturing the tire according to the first embodiment of the invention will be described.

[Tire Case Forming Step]

First, tire frame half parts supported by thin metal support rings are aligned to face each other. Then, a jointing mold is placed in such a manner as to be in contact with outer circumferential surfaces of abutting portions of the tire frame half part. The jointing mold is configured to press the periphery of bonding sections (abutting portions) of the tire frame half parts at a predetermined pressure (unillustrated). Then, the periphery of the bonding sections of the tire frame half parts is pressed at a melting point (or softening temperature) or higher of a thermoplastic resin material (polyamide-based thermoplastic elastomer in the present embodiment) that forms the tire frame. The bonding sections of the tire frame half parts are heated and pressed by the jointing mold so that the bonding sections are melted, the tire frame half parts are welded together, and these members are integrally formed into the tire frame 17.

[Resin-Coated Cord Forming Step]

Next, the resin-coated cord forming step is described. The steel cord 27 is unwound from a reel, and the surface of this steel cord 27 is washed. Subsequently, the outer circumference of the steel cord is coated with a polyamide-based adhesive extruded from an extruder. Then, the outer circumference of the steel cord on which an adhesion layer has been thus formed is coated with a coating composition (in this embodiment, a polyamide-based thermoplastic elastomer having a melting point of from 160° C. to 240° C.) extruded front an extruder whose mold temperature during extrusion is set to be not lower than the melting point of the adhesion layer (preferably, not lower than the melting point and in a range of from 160° C. to 200° C.), whereby the resin-coated cord 26, in which the outer circumference of the steel cord 27 is coated with the coating composition 28 via the adhesion layer that contains the polyamide-based adhesive and has a melting point of from 160° C. to 200° C., is formed. Thereafter, the thus formed resin-coated cord 26 is wound on a reel 58.

[Resin-Coated Cord Winding Step]

Figure 3:
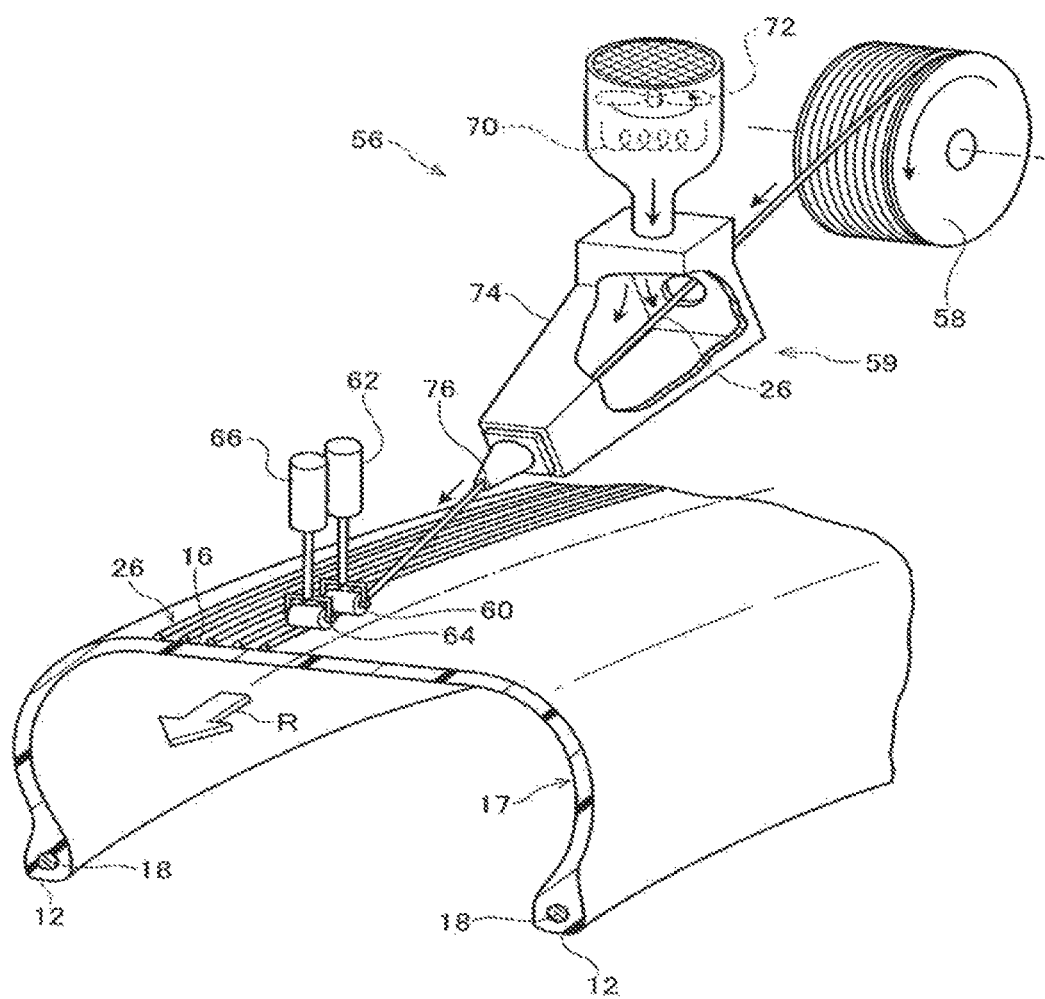
FIG. 3 is a drawing for explaining operations of arranging the resin-coated cord in the crown portion of the tire frame using a resin-coated cord heating device and rollers.

Next, a resin-coated cord winding step will be described with reference to FIG. 3. FIG. 3 is an explanatory diagram for describing an operation that installs the resin-coated cord in the crown portion of the tire frame using a resin-coated cord heating device and rollers. In FIG. 3, a resin-coated cord feeding apparatus 56 includes the reel 58 on which the resin-coated cord 26 is wound, the resin-coated cord heating device 59 disposed at a cord conveying direction downstream side of the reel 58, a first roller 60 disposed at a resin-coated cord 26 conveying direction downstream side, a first cylinder device 62 that moves the first roller 60 in a direction towards, or away from, a tire outer circumferential surface, a second roller 64 disposed at the resin-coated cord 26 conveying direction downstream side of the first roller 60, and a second cylinder device 66 that moves the second roller 64 in a direction towards, or away from, the tire outer circumferential surface. The second roller 64 may be employed as a cooling roller made of metal. A surface of the first roller 60 or the second roller 64 is coated with a fluorine resin (TEFLON (registered trademark) in the present embodiment) to suppress adhesion of the melted or softened resin material. Thereby, the heated resin-coated cord is firmly integrated with a resin of the frame.

The resin-coated cord heating device 59 includes a heater 70 and a fan 72 for generating hot air. The resin-coated cord heating device 59 also includes a heating box 74 to the interior of which hot air is supplied and through an interior space of which the resin-coated cord 26 passes, and a discharge outlet 76 that discharges the heated resin-coated cord 26.

In the present process, first, the temperature of the heater 70 in the resin-coated cord heating device 59 is raised, and surrounding air heated by the heater 70 is delivered to a heating box 74 by the air generated by rotation of the fan 72. Then, the resin-coated cord 26 unwound from the reel 58 is fed into the heating box 74, the interior space of which has been heated by the hot air, and heated (for example, the temperature of the resin-coated cord 26 is heated to from approximately 100° C. to approximately 250° C.). The heated resin-coated cord 26 passes through the discharge outlet 76, and is wound under a constant tension in a helical shape on the outer circumferential surface of the crown portion 16 of the tire frame 17 rotating in the arrow R direction in FIG. 3. When a coating resin of the heated resin-coated cord 26 contacts the outer circumferential surface of the crown portion 16, the resin material of a contact portion melts or softens, and is melt-bonded to a tire frame resin and integrated with the outer circumferential surface of the crown portion 16. In this case, the resin-coated cord is melted and bonded also to the resin-coated cord adjacent thereto so that winding is performed while no gap is present. Thereby, incorporation of air in a portion in which the resin-coated cord 26 is embedded can be suppressed.

The embedding depth L of the resin-coated cord 26 can be adjusted using a heating temperature of the resin-coated cord 26, a tension acting on the resin-coated cord 26, a pressure of the first roller 60, and the like. In the present embodiment, the embedding depth L of the resin-coated cord 26 is set to be 1/5 or greater of the diameter D of the resin-coated cord 26.

Then, a vulcanized, belt-shaped tread 30 is wound by a single turn on an outer circumferential surface of the tire frame 17, and the tread 30 is bonded to the outer circumferential surface of the tire frame 17 using a bonding agent or the like. Note that the tread 30 may be, for example, a pre-cured tread employed in conventionally-known recycled tires. The present process is similar to a process for bonding a pre-cured tread to an outer circumferential surface of a base tire of a recycled tire.

Then, bonding the seal layers 24 made of a vulcanized rubber to the bead portions 12 of the tire frame 17 using a bonding agent or the like thereby completes the tire 10.

(Effects)

In the tire 10 of the first embodiment of the invention, the resin-coated cord 26, in which the steel cord 27 used as a core is coated with the coating composition 28 containing a polyamide-based thermoplastic elastomer having a melting point of from 160° C. to 240° C. via the adhesion layer 25 which contains a polyamide-based adhesive and has a melting point of from 160° C. to 200° C., is wound on the outer circumferential surface of the tire frame 17 formed from a polyamide-based thermoplastic elastomer.

By controlling the mold temperature of an extruder used for applying the coating composition to be not lower than the melting point of the adhesion layer, the coating composition extruded from the extruder is allowed to melt a portion of the adhesion layer having a melting point of from 160° C. to 200° C., and this causes molecular entanglement and intermolecular interaction to take place due to heat fusion at the interface between the coating composition and the adhesion layer having a melting point of from 160° C. to 200° C., so that adhesion is improved.

In addition, by coating the adhesion layer that contains a polyamide-based adhesive and has a melting point of from 160° C. to 200° C. with the coating composition containing a polyimide-based thermoplastic elastomer having a melting point of from 160° C. to 240° C., a multiple resin layer having excellent durability against heat treatment is obtained.

Further, since the thermoplastic material contained in the coating composition 28 is a polyamide-based thermoplastic elastomer of the same kind as the resin material constituting the tire frame 17, the coating composition 28 and the tire frame 17 are highly adhesive to each other. In addition, the polyamide-based adhesive contained in the adhesion layer 25 having a melting point of from 160° C. to 200° C. is highly adhesive to the steel cord 27 and the coating composition 28 containing a polyamide-based thermoplastic elastomer having a melting point of from 160° C. to 240° C. When the resin-coated cord 26 is coated with the coating composition 28 containing a polyamide-based thermoplastic elastomer of the same kind as the resin material constituting the tire case 17 in this manner, the difference in hardness between the resin-coated cord 26 and the tire frame is smaller than a case where a resin material of a different kind is used. Therefore, the resin-coated cord 26 can be sufficiently adhered to and fixed with the tire frame 17.

Moreover, in the tire 10 of the first embodiment of the invention, the steel cord 27 is not directly coated with the coating composition 28 containing a polyamide-based thermoplastic elastomer, and the adhesion layer 25 is arranged therebetween, which adhesion layer 25 contains a polyamide-based adhesive showing high adhesiveness to both the steel cord 27 and the coating composition 28 and has a melting point of from 160° C. to 200° C. Thus, the steel cord 27 exhibits excellent adhesiveness to the coating composition 28. This consequently enables to effectively inhibit the movement of the reinforcing metal cord member during running.

In the tire 10 of the first embodiment of the invention, the resin-coated cord 26 having a higher rigidity than that of the resin material is circumferentially wound in a helical shape on the outer circumferential surface of the crown portion 16 of the tire frame 17 formed of the resin material. Therefore, a puncture resistance performance, a cut resistance performance, and a circumferential direction rigidity of the tire 10 are improved. In a case in which the circumferential direction rigidity of the tire 10 is improved, creep of the tire frame 17 formed of the thermoplastic resin material is suppressed.

In the tire 10 of the first embodiment of the invention, at least a portion of the resin-coated cord 26 is embedded in the outer circumferential surface of the crown portion 16 of the tire frame 17 formed of the resin material in a cross-sectional view taken along the axial direction of the tire frame 17 (the cross-section illustrated in FIG. 1A) while being in close contact with the resin material. Therefore, incorporation of air during manufacture is suppressed, and movement of the resin-coated cord 26 due to force input during running or the like is suppressed. As a result, occurrence of delamination or the like of the resin-coated cord 26, the tire frame 17, and the tread 30 is suppressed, and the durability of the tire 10 is improved.

In the tire 10 of the first embodiment of the invention, as illustrated in FIG. 2, the embedding depth L of the resin-coated cord is 1/5 or greater of the diameter D. Therefore, incorporation of air during manufacture is effectively suppressed and movement of the resin-coated cord 26 due to force input during running or the like is further suppressed.

in the tire 10 of the first embodiment of the invention, the annular bead cores 18 formed of a metal material are respectively embedded in the bead portions 12. Therefore, similarly to conventional rubber-made pneumatic tires, the tire frame 17, namely the tire 10, is firmly retained on the rim 20.

In the method of manufacturing the tire according to the first embodiment of the invention, the bonding sections of the tire frame half parts 17A are heated using the jointing mold. However, the invention is not restricted thereby. For example, the tire frame half parts 17A may be bonded to each other by heating the bonding sections by a separately provided high-frequency heater or the like, or by pre-softening or melting the bonding sections using hot air, irradiation with infrared radiation, or the like, and then pressing the same by the jointing mold.

In the method of manufacturing the tire according to the first embodiment of the invention, the resin-coated cord feeding apparatus 56 includes the two rollers consisting of the first roller 60 and the second roller 64. However, the invention is not restricted thereto, and may include any one of the rollers only (namely, a single roller).

In the method of manufacturing the tire according to the first embodiment of the invention, the embodiment is configured to heat the resin-coated cord 26 to melt or soften portions of the surface of the tire frame 17 at Which the heated reinforcing cord 26 is in contact. However, the invention is not restricted thereto, and a hot air generation device may be used to heat the outer circumferential surface of the crown portion 16 in which the resin-coated cord 26 is to be embedded, without heating the resin-coated cord 26, and then the resin-coated cord 26 may be embedded in the crown portion 16.

In the method of manufacturing the tire according to the first embodiment of the invention, a heat source of the resin-coated cord heating device 59 is a heater and a fan. However, the invention is not restricted thereto, and the resin-coated cord 26 may be directly heated with radiation heat (such as, for example, by infrared radiation).

Further, in the method of manufacturing the tire according to the first embodiment of the invention, melted or softened portions of the thermoplastic resin material in which the resin-coated cord 26 is embedded are forcibly cooled by the metal second roller 64. However, the invention is not restricted thereto. Configuration may be made such that the melted or softened portions of the thermoplastic resin material are directly blasted with cooling air, and the melted or softened portions of the thermoplastic resin material are forcibly cooled and hardened.

Winding the resin-coated cord 26 in a helical shape is easy in terms of manufacture, but methods in which the resin-coated cord 26 is discontinuously arranged in a width direction, or the like, may also be considered.

The tire 10 according to the first embodiment of the invention is what is called a tubeless tire in which the bead portions 12 are fitted to the rim 20 to form an air chamber between the tire 10 and the rim 20. However, the invention is not restricted thereto, and may be formed into a complete tube shape.

[Second Embodiment]

Figure 4:
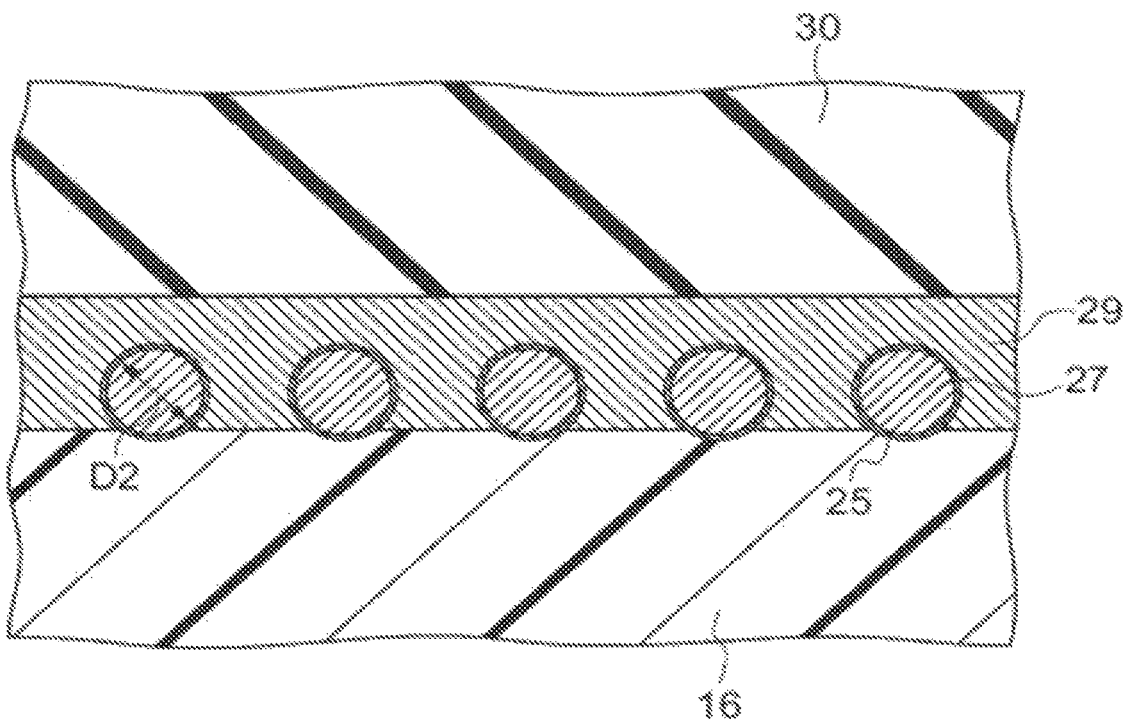
FIG. 4 is a cross-sectional view taken along the tire rotation axis, which illustrates a mode in which a reinforcing cord coating layer having a reinforcing metal cord member embedded therein is arranged on the crown portion of a tire frame of a tire according to a second embodiment.

Next, the tire according to a second embodiment of the invention will be described with reference to FIG. 4. FIG. 4 is a cross-sectional view taken along the tire rotation axis and illustrating a state in which a reinforcing cord coating layer in which a reinforcing metal cord member is embedded is on the crown portion of the tire frame of the tire according to a second embodiment.

As illustrated in FIG. 4, the tire according to the second embodiment of the invention includes a reinforcing cord coating layer 29 in which the steel cord 27 (the reinforcing metal cord member) is embedded in the surface of the crown portion 16 of the tire frame, in which a tread 30 is disposed on the reinforcing cord coating layer 29. The tire according to the second embodiment of the invention has a configuration similar to that of the first embodiment, except in the above points. The same reference numerals are herein allocated to configurations similar to those of the first embodiment.

In the tire according to the second embodiment of the invention, the tire frame 17 is formed using a polyamide-based thermoplastic elastomer having a melting point of 160° C. or more, similarly to the first embodiment described above.

As illustrated in FIG. 4, in the tire according to the second embodiment of the invention, the crown portion 16 is provided with the reinforcing cord coating layer 29 in which the steel cord 27 wound in the circumferential direction of the tire frame 17 is embedded. A portion of the steel cord 27 is embedded in the surface of the crown portion 16 of the tire frame 17 with the adhesion layer 25 therebetween. The reinforcing cord coating layer 29 is formed using a coating composition (coating composition similar to the coating composition 28 in the first embodiment described above) including at least a polyamide-based thermoplastic elastomer having a melting point of from 160° C. to 240° C. The adhesion layer 25 having a melting point of from 160° C. to 200° C. is formed using a polyamide-based adhesive (i.e. polyamide-based adhesive similar to that in the first embodiment described above).

A thickness of the reinforcing cord coating layer 29 is not particularly limited, and in consideration of the durability and adhesiveness to the tire frame 17 and the tread 30, an average layer thickness is preferably from approximately 0.2 mm to approximately 4.0 mm, more preferably from 0.5 mm to 3.0 mm, and particularly preferably from 0.5 mm to 2.5 mm.

The elastic modulus of the reinforcing cord coating layer 29 is preferably set in the range higher than the elastic modulus of the resin material forming the tire frame 17, and lower than the elastic modulus of the steel cord 27. In a case in which the elastic modulus of the reinforcing cord coating layer 29 is 20 times or less as great as the elastic modulus of the thermoplastic resin material forming the tire frame 17, the crown portion is not too hard, and fitting onto a rim is easily achieved.

Hereinafter, a method of manufacturing the tire according to the second embodiment of the invention will be described.

[Frame Forming Step]

First, similarly to the first embodiment described above, the tire frame half parts 17A are formed, and then heated and pressed with a jointing mold to form the tire frame 17.

[Reinforcing Metal Cord Member Winding Step]

A manufacturing apparatus which is used in the method for producing the tire according to the second embodiment of the invention is similar to that in first embodiment described above, and the manufacturing apparatus in which the steel cord 27 is wound on the reel 58 in the resin-coated cord feeding apparatus 56 illustrated in FIG. 3 is employed. Then, the steel cord 27 wound on the reel 58 is, similarly to the first embodiment, wound along the outer circumferential surface of the tire frame 17 while a portion of the steel cord 27 is embedded in the outer circumferential surface of the tire frame 17. In the method of manufacturing the tire according to the second embodiment of the invention, as described below, the reinforcing cord coating layer 29 is formed and then the steel cord 27 is embedded in this layer with the adhesion layer 25 therebetween, whereby the outer circumferential surface of the steel cord 27 is coated with the coating composition including at least a polyamide-based thermoplastic elastomer.

Thus, in the method of manufacturing the tire according to the second embodiment of the invention, a depth L of embedding the steel cord 27 in the crown portion 16 is preferably set at $\frac{1}{5}$ or less of a diameter D2 of the steel cord 27.

[Superposing Step]

Next, the coating composition described above is applied on the outer circumferential surface of the tire frame 17 in which the steel cord 27 is embedded using a melt-extruder or the like (unillustrated) to form the reinforcing cord coating layer 29. A temperature of a mold of the melt-extruder is set at a temperature that is higher than the melting point of the adhesive layer.

Then, a non-vulcanized cushion rubber is wound by a single turn on the formed reinforcing cord coating layer 29, and, for example, an adhesive, such as a rubber cement composition, is applied on the cushion rubber, and then one turn of a tread rubber in a vulcanized or semi-vulcanized state is wound on the adhesive, thereby configuring a base tire case state.

Then, the vulcanized and belt-shaped tread 30 is wound by a single turn on the outer circumferential surface of the tire frame 17 which is in the base tire frame state. The tread 30 is bonded to the outer circumferential surface of the tire frame 17 using a bonding agent or the like. Note that the tread 30 may be, for example, a pre-cured tread employed in conventional known recycled tires. The present step is similar to a step for bonding a pre-cured tread to an outer circumferential surface of a casing of a recycled tire.

Bonding the seal layers 24 formed of a vulcanized rubber to the bead portions 12 of the tire frame 17 using a bonding agent or the like completes the tire 10 according to the second embodiment of the invention.

(Effects)

The tire according to the second embodiment of the invention is provided with the reinforcing cord coating layer 29 on the outer circumferential surface of the tire frame 17, in addition to the effects of the tire according to the first embodiment. Therefore, it has an effect that the steel cord 27 can be fixed even more strongly on the tire frame 17.

Also in the tire according to the second embodiment of the invention, the steel cord 27 is wound in a helical shape on the crown portion 16, similarly to the first embodiment. However, the invention is not restricted thereto, and the steel cord 27 may be wound so as to be discontinuous in a width direction.

Although the invention have been explained above by way of embodiments, these embodiments are merely exemplifications, and various modifications may be implemented within a range not departing from the spirit of the invention. Obviously the scope of rights of the invention is not limited to these embodiments.

EXAMPLES

Hereinafter, the invention will be specifically described, but this description never restricts the invention.

Example 1

In accordance with the resin-coated cord forming step described above, a polyamide-based adhesive A-1 (i.e., 100% by mass) shown in Table 1 was heat-melted at 240° C. and adhered to a multifilament having an average diameter (φ) of 1.15 mm (a twisted cord obtained by twisting φ0.35-mm monofilaments (made of steel, strength: 280 N, elongation: 3%)) such that an average layer thickness of 100 μm was attained, and the resultant was coated with a coating composition (polyamide-based thermoplastic elastomer) N-1 (i.e., 100% by mass) extruded from an extruder having a preset mold temperature of 200° C. and then cooled, whereby a reinforcing metal cord (resin-coated cord) in which the outer circumference of the multifilament was coated with the coaling composition N-1 via an adhesion layer containing the polyamide-based adhesive A-1 was obtained.

A tire was formed using the thus obtained resin-coated cord in the same manner as in the above-described first embodiment. As the material for forming the tire frame, the same material as the polyamide-based thermoplastic elastomer (N-1) used in the coating composition was used.

The melting point of the adhesion layer was determined as the temperature at which an endothermic peak was observed in a curve (DSC curve) obtained by differential scanning calorimetry (DSC). The melting point was measured in accordance with ASTMD3418-8 using a differential scanning calorimeter. Specifically, a measurement subject was placed on an aluminum pan and an empty pan was set as a control, after which the measurement was performed at a heating rate of 10°C./min. The melting point of indium and that of zinc were used for temperature correction of the detection unit of the measuring device, and the fusion heat of indium was used for colorimetric correction.

Examples 2 to 4 and Comparative Examples 1 to 4

In Examples 2 to 4 and Comparative Examples 3 and 4, a resin-coated cord and a tire were produced in the same manner as in Example 1, except that the polyamide-based adhesive A-1 was changed to each polyamide-based adhesive or hot melt-based adhesive shown in Table 1. In Comparative Example 2, a resin-coated cord and a tire were produced in the same manner as in Example 1, except that the coating composition N-1 was changed to the coating composition N-2 shown in Table 1.

<Evaluation>

1. Post-Heat Treatment Adhesiveness Reduction Rate

The adhesiveness reduction rate was evaluated by the following procedure.

Two of each resin-coated cord thus obtained in Examples and Comparative Examples were prepared. One of them was used as an unheated sample, and the other was heated for 30 minutes in a 140° C. oven and used as a heat-treated sample.

For the thus obtained unheated sample and heat-treated sample, using "TENSILON RTF-1210" manufactured by A&D Co., Ltd. and in accordance with the test method prescribed in JIS K6854-2:1999 "Adhesives—Determination of Peel Strength of Bonded Assemblies—Part 2: 180-degree Peel", the adhesion between the multifilament (reinforcing metal cord) and the polyamide-based or hot melt-based adhesive (adhesion layer) in each resin-coated cord was evaluated by a 180° peel test at a tensile rate of 100 mm/min, and the peel strength (unit: N) was measured. The peel strength of the heat-treated sample with respect to that of the unheated sample was evaluated in terms of percentage (%) as the post-heat treatment adhesiveness reduction rate.

It is noted here that a post-heat treatment adhesiveness reduction rate of 5% or less indicates favorable adhesion, while a post-heat treatment adhesiveness reduction rate of higher than 5% indicates poor adhesion.

2. Adhesion Between Thermoplastic Elastomer and Adhesion Layer

For each of the resin-coated cords of Examples and Comparative Examples, the unheated sample was subjected to a peel test in the same manner as in the above-described evaluation of "1. Post-Heat Treatment Adhesiveness Reduction Rate" so as to evaluate the adhesion between the thermoplastic elastomer (coating composition) and the adhesion layer. In the peel test, the adhesion was evaluated as "A" when peeling was observed between the reinforcing metal cord and the adhesion layer, or "B" when peeling was observed between the adhesion layer and the coating composition. An evaluation result of "A" indicates favorable adhesion between the coating composition and the adhesion layer, while an evaluation result of "B" indicates poorer adhesion than "A".

3. Post-Heat Treatment Durability of Resin-Coated Cord

From the results of the above-described evaluations of "1. Post-Heat Treatment Adhesiveness Reduction Rate" and "2. Adhesion between Thermoplastic Elastomer and Adhesion Layer", the post-heat treatment durability of each resin-coated cord was evaluated based on the below-described criteria. An evaluation result of "A" described below indicates that the resin-coated cord had excellent post-heat treatment durability, with the durability being poorer in the order of "A", "B" and "C".

—Evaluation Criteria—

A: The post-heat treatment adhesiveness reduction rate was 5% or less and, in the peel peeling was observed between the reinforcing metal cord and the adhesion layer.

B: The post-heat treatment adhesiveness reduction rate was 5% or less and, in the peel test, peeling was observed between the adhesion layer and the coating composition, C: The post-heat treatment adhesiveness reduction rate was higher than 5%.

4. Tensile Characteristics

For each of the polyamide-based adhesives and hot-melt adhesives used in the respective adhesion layers of Examples and Comparative Examples, a sample was prepared by injection molding using a mold of 127 mm×12.7 mm×1.6 mm (length×width×thickness). In the preparation, each sample of Examples and Comparative Examples was injection-molded at 240° C. Further, each sample was punched out to prepare a dumbbell-shaped test piece (No. 5 test piece) defined in JIS K6251:1993.

Then, using SHIMADZU AUTOGRAPH AGS-J (5 kN) manufactured by Shimadzu Corporation, the tensile yield strength and tensile elastic modulus of each test piece were measured at a tensile rate of 200 mm/min.

5. Storage Elastic Modulus

For each of the polyamide-based adhesives and hot-melt adhesives used in the respective adhesion layers of Examples and Comparative Examples, the storage elastic modulus was measured at 23° C., 100° C., 125° C., 140° C. and 150° C. in accordance with JIS K6394:2007.

6. Deformation Resistance at High Temperature

The deformation resistance at a high temperature was evaluated by the following procedure.

Unvulcanized tires were produced using each of the resin-coated cords obtained in Examples and Comparative Examples and then heated for 20 minutes using a vulcanizer at 170° C. After this vulcanization, a cut sample was prepared from each tire, and the deformation state of the coating resin of the resin-coated cord and that of the adhesion layer were observed with the naked eye. As a result of the observation, the deformation resistance was evaluated as "A" when there was no practical problem in the use as a tire reinforcing material, or "C" when deformation of the tire causing a practical problem, such as swelling, tearing or hole generation, was observed.

TABLE 1

|  |  | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Coating composition | N-1 | 100 | 100 | 100 | 100 | 100 |  | 100 | 100 |
|  | N-2 |  |  |  |  |  | 100 |  |  |
| Adhesion layer | A-1 | 100 |  |  |  |  | 100 |  |  |
|  | A-2 |  | 100 |  |  |  |  |  |  |
|  | A-3 |  |  | 100 |  |  |  |  |  |
|  | A-4 |  |  |  |  | 100 |  |  |  |
|  | A-5 |  |  |  |  |  |  | 100 |  |
|  | A-6 |  |  |  | 100 |  |  |  |  |
|  | A-7 |  |  |  |  |  |  |  | 100 |
| Measured value | Layer thickness of coating composition (μm) | 400 | 400 | 400 | 400 | 400 | 400 | 400 | 400 |
|  | Thickness of adhesion layer (μm) | 100 | 100 | 100 | 100 | 100 | 100 | 100 | 100 |
|  | Melting point of adhesion layer (° C.) | 171 | 178 | 196 | 164 | 142 | 171 | 146 | 205 |
|  | Tensile yield strength (MPa), 23° C. | 28.1 | 20.3 | 29.1 | 16.8 | 25.1 | 28.1 | 33.0 | 25.2 |
|  | Tensile elastic modulus (MPa), 23° C. | 826 | 495 | 810 | 320 | 957 | 826 | 695 | 580 |
|  | Storage modulus (MPa), 23° C. | 345 | 159 | 354 | 134 | 337 | 345 | 223 | 186 |
|  | Storage modulus (MPa), 100° C. | 30.6 | 36.2 | 57.2 | 11.9 | 37 | 30.6 | 50.8 | 42.3 |
|  | Storage modulus (MPa), 125° C. | 8.18 | 18.5 | 44.3 | 3.18 | 7 | 8.18 | 26.0 | 21.6 |
|  | Storage modulus (MPa), 140° C. | 1.86 | 8.97 | 33.2 | 0.72 | not measurable | 1.86 | 12.6 | 10.5 |
|  | Storage modulus (MPa), 150° C. | 0.69 | 4.28 | 24.1 | 0.27 | not measurable | 0.69 | not measurable | 5.01 |
|  | Post-heat treatment adhesiveness reduction rate (%) (treatment temperature: 140° C.) | 0.8 | 0 | 0 | 1 | 7 | 0.8 | 6 | 0 |
| Evaluation Results | Adhesion between thermoplastic elastomer and adhesion layer (resin coating temperature: 240° C.) | A | A | B | A | A | A | A | C |
|  | Post-heat treatment durability of resin-coated cord | A | A | B | A | C | A | C | C |
|  | Deformation resistance at high temperature | A | A | A | A | C | C | C | A |

The components shown in Table 1 are as follows.

A-1: "A6492" manufactured by Daicel-Evonik Ltd. (polyamide-based adhesive, melting point: 171° C.)

A-2: "B409" manufactured by ARKEMA K.K. (polyamide-based adhesive, melting point: 178° C.)

A-3: "PA40L" manufactured by TICK TOKA Corporation (polyamide-based adhesive, melting point: 196° C.)

A-4: "ADMER QE060" manufactured by Mitsui Chemicals, Inc. (hot melt-based adhesive: acid-modified polypropylene resin, melting point: 142° C.)

A-5: "M1186" manufactured by ARKEMA K.K. (polyamide-based adhesive, melting point: 148° C.)

A-6: "A6560" manufactured by Daicel-Evonik Ltd. (polyamide-based adhesive, melting point: 164° C.)

A-7: "PA50M" manufactured by T&K TOKA Corporation (polyamide-based adhesive, melting point: 205° C.)

N-1: "UBESTA XPA9055" manufactured by UBE Industries, Ltd. (polyamide-based thermoplastic elastomer (TPA), melting point: 167° C.)

N-2: "UBESTA XPA9040" manufactured by UBE Industries, Ltd. (polyamide-based thermoplastic elastomer (TPA), melting point: 145° C.)

As shown in Table 1, it is seen that the coated reinforcing metal cords in the tires of Examples had a lower post-heat treatment adhesiveness reduction rate than the coated reinforcing metal cords in the tires of Comparative Examples. In addition, it is seen that the coated reinforcing metal cords in the tires of Examples also had excellent adhesion between the thermoplastic elastomer and the adhesion layer. From these results, it is understood that the coated reinforcing metal cords in the tires of Examples have excellent durability of a multiple resin layer after heat treatment. Furthermore, tires in which these excellent-durability reinforcing metal cords are wound on the outer circumference of a tire frame are expected to show superior durability as compared to the tires of Comparative Examples.

The invention claimed is:

1. A tire, comprising:
   a tire frame; and
   a reinforcing metal cord member that is wound on at least an outer circumference of the tire frame,
   wherein at least a portion of the reinforcing metal cord member is coated with a coating composition comprising at least one thermoplastic material selected from a polyamide-based thermoplastic resin having a melting point of from 160° C. to 240° C. or a polyamide-based thermoplastic elastomer having a melting point of from 160° C. to 240° C., and
   wherein the at least a portion of the reinforcing metal cord member is coated with the coating composition via an adhesion layer having a melting point of from 160° C. to 200° C. and comprising a polyamide-based adhesive.

2. The tire according to claim 1, wherein the melting point of the adhesion layer is from 160° C. to 180° C.

3. The tire according to claim 2, wherein a thickness of the adhesion layer is in a range of from 5 μm to 200 μm.

4. The tire according to claim 2, wherein a thickness of the coating composition is in a range of from 10 μm to 1,000 μm.

5. The tire according to claim 2, wherein a thickness ratio of the adhesion layer to the coating composition (adhesion layer/coating composition) is from 1/20 to 10/1.

6. The tire according to claim 2, wherein the tire frame comprises a resin material comprising a resin component in an amount of from 50% by mass to 100% by mass.

7. The tire according to claim 1, wherein a thickness of the adhesion layer is in a range of from 5 μm to 200 μm.

8. The tire according to claim 7, wherein a thickness of the coating composition is in a range of from 10 μm to 1,000 μm.

9. The tire according to claim 7, wherein a thickness ratio of the adhesion layer to the coating composition (adhesion layer/coating composition) is from 1/20 to 10/1.

10. The tire according to claim 7, wherein the tire frame comprises a resin material comprising a resin component in an amount of from 50% by mass to 100% by mass.

11. The tire according to claim 1, wherein a thickness of the coating composition is in a range of from 10 μm to 1,000 μm.

12. The tire according to claim 11, wherein a thickness ratio of the adhesion layer to the coating composition (adhesion layer/coating composition) is from 1/20 to 10/1.

13. The tire according to claim 11, wherein the tire frame comprises a resin material comprising a resin component in an amount of from 50% by mass to 100% by mass.

14. The tire according to claim 1, wherein a thickness ratio of the adhesion layer to the coating composition (adhesion layer/coating composition) is from 1/20 to 10/1.

15. The tire according to claim 14, wherein the tire frame comprises a resin material comprising a resin component in an amount of from 50% by mass to 100% by mass.

16. The tire according to claim 1, wherein the tire frame comprises a resin material comprising a resin component in an amount of from 50% by mass to 100% by mass.

17. The tire according to claim 1, wherein the coating composition comprises both the polyamide-based thermoplastic resin and the polyamide-based thermoplastic elastomer and has a sea phase, which is a matrix phase comprising the polyamide-based thermoplastic resin, and an island phase, which is a dispersed phase comprising the polyamide-based thermoplastic elastomer.

18. The tire according to claim 17, wherein a mass ratio of the polyamide-based thermoplastic resin (p) to the polyamide-based thermoplastic elastomer (e) in the coating composition (p/e) is from 95/5 to 55/45.

19. The tire according to claim 17, wherein a size of the island phase comprising the polyamide-based thermoplastic elastomer is from 0.4 μm to 10.0 μm.

20. The tire according to claim 1, wherein the tire comprises a tire frame, and the tire frame does not comprise a vulcanized rubber.

21. The tire according to claim 1, wherein the tire comprises a tire frame, and the tire frame comprises at least one selected from the group consisting of a polyamide-based thermoplastic elastomer, a polyamide-based thermoplastic resin, a polyester-based thermoplastic elastomer and a polyester-based thermoplastic resin.

22. The tire according to claim 21, wherein the tire frame comprises at least one selected from the group consisting of a polyamide-based thermoplastic elastomer and a polyamide-based thermoplastic resin.

23. A method of producing a tire, the method comprising:
   forming a tire frame;
   coating at least a portion of a reinforcing metal cord member with a coating composition comprising at least one thermoplastic material selected from a polyamide-based thermoplastic resin having a melting point of from 160° C. to 240° C. or a polyamide-based thermoplastic elastomer having a melting point of from 160° C. to 240° C., wherein the at least a portion of the reinforcing metal cord member is coated with the coating composition via an adhesion layer having a melting point of from 160° C. to 200° C. and comprising a polyamide-based adhesive; and
   winding the reinforcing metal cord member onto the tire frame,
   wherein the coating of the at least a portion of the reinforcing metal cord member with the coating composition is performed by extruding the coating composition from an extruder having a mold temperature that is not lower than the melting point of the adhesion layer and that is from 160° C. to 200° C.

* * * * *